(12) United States Patent
Yoshimura et al.

(10) Patent No.: US 7,212,372 B2
(45) Date of Patent: May 1, 2007

(54) MAGNETIC TAPE AND MAGNETIC TAPE CARTRIDGE

(75) Inventors: Ken Yoshimura, Kyoto (JP); Tsugihiro Doi, Osaka (JP)

(73) Assignee: Hitachi Maxell, Ltd., Osaka (JP)

( * ) Notice: Subject to any disclaimer, the term of this patent is extended or adjusted under 35 U.S.C. 154(b) by 601 days.

(21) Appl. No.: 10/343,716

(22) PCT Filed: Aug. 13, 2002

(86) PCT No.: PCT/JP02/08241

§ 371 (c)(1),
(2), (4) Date: Jul. 28, 2003

(87) PCT Pub. No.: WO03/017259

PCT Pub. Date: Feb. 27, 2003

(65) Prior Publication Data

US 2004/0021024 A1 Feb. 5, 2004

(30) Foreign Application Priority Data

Aug. 15, 2001 (JP) .............................. 2001-246772

(51) Int. Cl.
*G11B 5/596* (2006.01)
(52) U.S. Cl. .................................... 360/77.05; 242/348
(58) Field of Classification Search ................ 428/845, 428/694 B
See application file for complete search history.

(56) References Cited

U.S. PATENT DOCUMENTS

| 4,347,534 A | * | 8/1982 | Kimura | .................... 360/77.12 |
| 4,390,917 A | * | 6/1983 | Watanabe | .................... 360/128 |
| 4,611,249 A | * | 9/1986 | McClure | .................. 360/77.01 |
| 4,670,800 A | * | 6/1987 | McClure | .................. 360/77.11 |
| 4,913,328 A | * | 4/1990 | Schulz | ......................... 226/21 |
| 6,108,159 A | * | 8/2000 | Nute et al. | ................ 360/77.12 |
| 6,228,461 B1 | | 5/2001 | Sueki et al. | |
| 6,243,225 B1 | * | 6/2001 | Wyman et al. | .......... 360/77.12 |
| 6,690,535 B2 | * | 2/2004 | Wang | ...................... 360/77.12 |
| 6,781,784 B2 | * | 8/2004 | Peterson | ...................... 360/76 |
| 6,865,050 B2 | * | 3/2005 | Nakao et al. | .................. 360/75 |
| 2001/0054340 A1 | | 12/2001 | Fujikata | |

FOREIGN PATENT DOCUMENTS

JP          4-106723 A          4/1992

(Continued)

*Primary Examiner*—K. Wong
(74) *Attorney, Agent, or Firm*—Birch, Stewart, Kolasch & Birch, LLP

(57) ABSTRACT

There is provided a magnetic tape, to be used at a running speed of at least 4,000 mm/sec., wherein servo signals for controlling tracking are recorded on the magnetic layer or the backcoat layer, and wherein the difference between the recording track width and the reproducing track width is 16 μm or less, characterized in that the value of [α/(Tw−Tr)] is 0.2 or less, wherein a [μm] is an amount of a weave occurring on one of both edges of the magnetic tape and on the side of reference for the running of the tape; Tw [μm] is a recording track width; and Tr [μm] is a reproducing track width; and that a coefficient of humidity expansion in the tape widthwise direction is (0 to 14)×10⁻⁶/% RH; and a coefficient of thermal expansion in the tape widthwise direction is (0 to 10)×10⁻⁶/° C. This magnetic tape has a recording track width of 28 μm or less, and is excellent in servo performance, since a decrease in reproduction output due to off-track hardly occurs even when the difference between the recording track width and the reproducing track width is 16 μm or less.

15 Claims, 9 Drawing Sheets

FOREIGN PATENT DOCUMENTS

| | | |
|---|---|---|
| JP | 8-102053 A | 4/1996 |
| JP | 9-54939 A | 2/1997 |
| JP | 9-219016 A | 8/1997 |
| JP | 10-228623 A | 8/1998 |
| JP | 2000-155938 A | 11/1998 |
| JP | 11-096545 A | 4/1999 |
| JP | 11-96545 A | 4/1999 |
| JP | 11-126327 A | 5/1999 |
| JP | 11-126328 A | 5/1999 |
| JP | 11-213384 A | 8/1999 |
| JP | 11-238225 A | 8/1999 |
| JP | 11-250449 A | 9/1999 |
| JP | 11-297034 A | 10/1999 |
| JP | 11-339254 A | 12/1999 |
| JP | 2000-30242 A | 1/2000 |
| JP | 2000-40217 A | 2/2000 |
| JP | 2000-40218 A | 2/2000 |
| JP | 2000-173046 A | 6/2000 |
| JP | 2000-293836 A | 10/2000 |
| JP | 2000-32316 A | 11/2000 |
| JP | 2001-110164 A | 4/2001 |
| JP | 2001-325708 A | 11/2001 |
| JP | 2001-325720 A | 11/2001 |
| JP | 2002-245745 A | 8/2002 |

* cited by examiner

MAGNETIC TAPE AND MAGNETIC TAPE CARTRIDGE

This application is the national phase under 35 U.S.C. § 371 of PCT International Application No. PCT/JP02/08241 which has an International filing date of Aug. 13, 2002, which designated the United States of America.

TECHNICAL FIELD

The present invention relates to a magnetic tape which has a large recording capacity, and permits a high access speed and a high transfer speed, and to a magnetic tape cartridge comprising the same. In particular, the present invention relates to a magnetic tape on which magnetic signals or optical signals for servo tracking are recorded and from which magnetically recorded signals are reproduced with reproducing heads comprising magnetoresistance elements (hereinafter referred to as "MR heads"), and a single reel type magnetic tape cartridge comprising the same, suitable for use in data-backup.

BACKGROUND ART

Magnetic tapes have found various applications in audio tapes, videotapes, computer tapes, etc. In particular, in the field of magnetic tapes for data-backup (or backup tapes), tapes having memory capacities of 100 GB or more per reel are commercialized in association with increased capacities of hard discs for back-up. Therefore, it is inevitable to increase the capacity of this type of tape for data-backup. It is also necessary to increase the feeding speed of tape and a relative speed between the tape and heads in order to quicken the access speed and the transfer speed.

To increase the capacity of tape for data-backup per one reel, it is necessary to increase the length of tape per reel by decreasing the total thickness of the tape, to reduce the thickness demagnetization so as to shorten the recording wavelength by forming a magnetic layer with a thickness as very thin as 0.3 μm or less, and to increase the recording density in the tape-widthwise direction by narrowing the widths of the recording tracks.

When the thickness of the magnetic layer is reduced to 0.3 μm or less, the durability of the tape tend to lower. Therefore, at least one primer layer is provided between a non-magnetic support and the magnetic layer. When the recording wavelength is shortened, the influence of spacing between the magnetic layer and the magnetic heads becomes serious. Thus, if the magnetic layer has large projections or dents, the output decreases due to the spacing loss, so that the error rate increases.

When the recording density in the tape-widthwise direction is increased by narrowing the width of the recording tracks, magnetic flux leaking from the magnetic tape is decreased. Therefore, it is needed to use, for reproducing heads, MR heads which make use of magneto-resistance elements capable of achieving high output even when the magnetic fluxes are very small.

Examples of the magnetic recording media which can correspond to MR heads are disclosed in JP-A-11-238225, JP-A-2000-40217 and JP-A-2000-40218. In these magnetic recording media, skewness of output from the MR heads is prevented by controlling the magnetic fluxes from the magnetic recording medium (a product of a residual magnetic flux density and the thickness of the medium) to a specific value or less, or the thermal asperity of the MR heads is reduced by lessening the dents on the surface of the magnetic layer to a specific value or less.

When the width of the recording tracks is decreased, the reproduction output lowers due to off-track. To avoid such a problem, track servo is needed. As types of such track servo, there are an optical servo type (JP-A-11-213384, JP-A-11-339254 and JP-A-2000-293836) and a magnetic servo type. In either of these types, it is necessary that track servo is performed on a magnetic tape which is drawn out from a magnetic tape cartridge (which may be also called a cassette tape) of single reel type which houses only one reel for winding the magnetic tape, in a box-shaped casing body. The reason for using a single reel type cartridge is that a tape cannot be stably run in a two-reel type cartridge which has two reels for drawing out the tape and for winding the same, when the tape-running speed is increased (for example, 2.5 m/second or higher). The two-reel type cartridge has other problems in that the dimensions of the cartridge become larger and that the memory capacity per volume becomes smaller.

As mentioned above, there are two types of track servo systems, i.e., the magnetic servo type and the optical servo type. In the former track servo type, servo bands as shown in FIG. 10 are formed on a magnetic layer by magnetic recording, and servo tracking is performed by magnetically reading such servo bands. In the latter optical servo type, servo bands each consisting of an array of pits are formed on a backcoat layer by laser irradiation or the like, and servo tracking is performed by optically reading such servo bands. Other than these types, there is such magnetic serve type in which magnetic servo signals are also recorded on a magnetized backcoat layer (for example, JP-A-11-126327). Further, in other optical servo type, optical servo signals are recorded on a backcoat layer, using a material capable of absorbing light or the like (for example, JP-A-11-126328).

Then, the principle of the track servo system is simply described by way of the former magnetic servo type.

As shown in FIG. 10, in the magnetic tape (3) for the magnetic servo type, servo bands (200) for track serve which extend along the lengthwise direction of the tape and are spaced from one another at about 2.8 mm intervals, and data tracks (300) for recording data thereon are formed on the magnetic layer. Each servo band (200) consists of a plurality of servo signal-recording sections (201) on which the respective servo track numbers are magnetically recorded. A magnetic head array (not shown), which records and reproduces data on a magnetic tape, consists of a pair of MR heads for servo track (forward running and backward running) at both ends, and for example, 8×1 pairs of recording-reproducing heads (in which the recording heads are magnetic induction type heads and the reproducing heads are MR heads) which are arranged between both the MR heads for servo tracking. In response to a signal from the MR head for servo track which has read a servo signal, the entire magnetic head array moves interlocking with each other, so that the recording-reproducing heads move in the widthwise direction of the tape to reach the data tracks (for example, in case of the magnetic head array on which 8×1 pairs of recording-reproducing heads are arranged, eight data tracks are formed corresponding to a pair of serve tracks).

In this stage, the magnetic tape runs in such a state that one of both tape edges extending along the lengthwise direction is regulated in its tape widthwise position by the inner surface of a flange of a guide roller provided in a magnetically recording-reproducing unit (a tape-driving unit) (see FIG. 8). As seen in FIG. 4, the edge (3a) of the magnetic tape (3) generally has corrugated unevenness called edge weave or edge wave (unevenness formed by the waving of the widthwise edge of the tape alongside the tape lengthwise direction). Therefore, the magnetic tape (3), even though running alongside the inner surface of the flange as the reference for the tape running, very slightly fluctuates in its position in the widthwise direction. However, this problem is solved by employing the above-mentioned servo system: that is, even if the position of the magnetic tape very slightly fluctuates in the widthwise direction, the entire magnetic head array moves in the tape widthwise direction in association with such a fluctuation, so that the recording-reproducing head can always reach the correct data tracks.

In this case, if the tape has a high edge weave α having a frequency [(V/f): $s^{-1}$=Hz] of 80 Hz or more (particularly 200 Hz or more), wherein V is a tape-running speed and f is a cycle of the edge weave, the magnetic head array cannot follow the tracks. Thus, dislocation from the tracks occurs. However, such dislocation from the tracks is not so serious, in case where the recording track width is as wide as 30 μm or more, and where the difference between the recording track width and the reproducing track width [(recording track width)–(reproducing track width)] exceeds 16 μm (for example, the recording track width is about 80 μm, and the reproducing track width, about 50 μm). This is because, when the recording track width is as wide as 30 μm or more and when the above difference exceeds 16 μm, the recording track width is sufficiently wider than the reproducing track width, so that the magnetic head array can run on the recording tracks, even if dislocation of several μm from the track occurs. Thus, such dislocation does not leads to a decrease in output.

In another case, when a temperature or a humidity changes, dislocation from the tracks tends to occur, because the magnetic tape expands or contracts in the tape-widthwise direction in association with such a change. The methods of solving this problem by lessening the coefficients of temperature and/or humidity expansion of a magnetic tape are disclosed in JP-A-04-106723, JP-A-09-219016, JP-A-04-106723, JP-A-11-096545 and JP-A-11-250449. However, such dislocation from tracks in association with a change in temperature and/or humidity is not so serious for the same reason as above, in case where the recording track width is as wide as 30 μm or more, and where the above difference exceeds 16 μm. In this regard, although the expansion of a magnetic tape in the lengthwise direction due to a change in temperature and/or humidity may change the recording wavelength or the like, correction with circuits is possible for such a change.

As a result of further investigation, it is found that such a change in temperature and/or humidity does not induce a serious problem under specified conditions, even though the recording track width is 30 μm or less, and the above difference is 16 μm or less. That is, a decrease in reproduction output due to off-track hardly causes a problem under the following conditions (a) or (b): (a) dislocation from the tracks due to a change in temperature and/or humidity is small, although dislocation from the tracks due to the edge weave is large; and (b) dislocation from the tracks due to the edge weave is small, although dislocation from the tracks due to a change in temperature and/or humidity is large.

However, as a result of more intensive investigation, it was revealed that a decrease in reproduction output due to off-track tends to occur, even though the amount of the edge weave and the coefficient of thermal and/or humidity expansion are each singly negligibly small, in case where the recording track width is so narrow as 28 μm or less and the above difference of [(recording track width)–(reproducing track width)] is 16 μm or less. While there is a fluctuation of several micrometers in position between the recording heads and the reproducing heads in the apparatus, this fluctuation becomes at least two times larger under the worst combination of the conditions. The dislocation from the tracks due to the edge weave and a change in temperature/humidity further gives adverse influence, which results in a decrease in reproduction output. This phenomenon is remarkable when the difference of [(recording track width)–(reproducing track width)] is 10 μm or less.

When the width of the recording track is further reduced to 21 μm or less, a decrease in reproduction output due to off-track appears in spite of about 2 μm of edge weave, which has raised no problem in the conventional recording tracks. This is because, when the reproducing track width should be equal to a conventional one in order to ensure a reproduction output, the off-track margin becomes narrower. Further, when the recording track width is as narrow as 21 μm or less, it is confirmed that not only the absolute value of edge weave but also the cycle of the edge weave and the tape running speed have a complicated relationship with the off-track. To apply the servo system to a magnetic tape having recording tracks with a width as narrow as 21 μm or less, a relationship among the cycle and the amount of edge weave, the recording track width, the reproducing track width and the tape running speed with respect to the head followability is carefully examined. As a result, the following are revealed: a position error signal (or PES, i.e. a value indicating a fluctuation in positional dislocation; the value of a standard deviation 1) becomes higher, resulting in a tracking error, if the values of [α/(Tw−Tr)] and [α/(Tw−Tr)]×(V/f) exceed specific values, wherein α is an amount of the edge weave (in the tape widthwise direction of the tape edge (the direction Y–Y' on FIG. 4)) having a cycle of f; V [mm/second] is a tape running speed; Tw [μm] is a recording track width; and Tr [μm] is a reproducing track width. This problem is considered to arise as follows. Since the magnetic head array as a whole has large mass, the magnetic head array cannot move following the motion of the magnetic tape in the widthwise direction, when the values of [α/(Tw−Tr)] and [α/(Tw−Tr)×(V/f)] exceed specific values. As a result, a position error signal or PES becomes higher. In case where the off-track margin is small, the off-track becomes larger to cause a such a tracking error.

DISCLOSURE OF THE INVENTION

The present invention is to overcome the foregoing problems, and an object thereof is to provide a magnetic tape which hardly causes a decrease in reproduction output due to an off-track even when the width of the recording tracks is as narrow as 28 μm or less (particularly 21 μm or less) and when the difference between the recording track width and the reproducing track width [(recording track width)–(reproducing track width)] is 16 μm or less (particularly 10 μm or less), and a magnetic tape cartridge comprising the same.

As a result of the present inventors' intensive researches in order to achieve the above object, they have found out that, if the amount of edge weave and the cycle thereof are set within specified ranges in relationship with the recording track width, the reproducing track width and further with the tape-running speed and also the coefficients of humidity and thermal expansions of the magnetic tape in the widthwise direction are specific values or less, an off-track hardly occurs in a magnetic tape, even when the width of the recording tracks is as narrow as 28 μm or less (particularly 21 μm or less) and the above difference is 16 μm or less (particularly 10 μm or less), and also even when a change in temperature and/or humidity arises.

The present invention is accomplished based on such findings. The inventions according to the first to the fourth aspects pertain to a magnetic tape which is to be used at a tape-running speed of 4,000 mm/sec. or higher and which comprises a non-magnetic support, a magnetic layer formed on one surface of the non-magnetic support, and a backcoat layer formed on the other surface of the non-magnetic support, wherein servo signals for controlling tracking are recorded on the magnetic layer or the backcoat layer, and wherein the difference between the recording track width and the reproducing track width, i.e., [(recording track width)−(reproducing track width)] is 16 μm or less (particularly 10 μm or less). This magnetic tape satisfies each of the following conditions, wherein V [mm/sec.] is a tape-running speed; α [μm] is an amount of edge weave with a cycle of f [mm] formed on one edge on the reference side for the tape running, or the other edge of the magnetic tape; Tw [μm] is a recording track width; and Tr [μm] is a reproducing track width.

Firstly, in the invention according to the first aspect, the value of $[\alpha/(Tw-Tr)]$ is set at 0.2 or less ($[\alpha/(Tw-Tr)] \leq 0.2$); and the coefficient of humidity expansion in the tape widthwise direction is $(0 \text{ to } 14) \times 10^{-6}/\%$ RH, and the coefficient of thermal expansion in the tape widthwise direction is $(0 \text{ to } 10) \times 10^{-6}/° C$.

The value of $[\alpha/(Tw-Tr)]$ is preferably 0.14 or less, more preferably 0.10 or less, particularly 0 as the best. By setting this value within the above range, an off-track is hard to occur, even when the difference of [(recording track width)−(reproducing track width)] is as small as 16 μm or less and when the temperature and/or the humidity change during the recording operation or the reproducing operation.

The coefficient of humidity expansion is set at a value within a range of $(0 \text{ to } 14) \times 10^{-6}/\%$ RH, because it becomes hard to read reproduction signals outside this range, due to the expansion or contraction of the tape which results in off-track. To further reliably prevent such off-track, it is preferable to set the coefficient of humidity expansion in the tape widthwise direction at a value within a range of $(0 \text{ to } 7) \times 10^{-6}/\%$ RH, more preferably $(0 \text{ to } 5) \times 10^{-6}/\%$ RH, particularly at zero as the best. According to the experiments conducted by the present inventors, no negative coefficient of humidity expansion was found. In this regard, off-track is similarly caused, also, in case where a magnetic tape has a negative coefficient of humidity expansion.

The coefficient of thermal expansion is set at a value within a range of $(0 \text{ to } 10) \times 10^{-6}/° C$., because it becomes hard to read reproduction signals for reading the recorded signals outside this range, due to the thermal expansion or contraction of the tape, which results in off-track. To further reliably prevent such off-track, it is preferable to set the coefficient of thermal expansion in the tape widthwise direction at a value within a range of $(0 \text{ to } 7) \times 10^{-6}/° C$., more preferably $(0 \text{ to } 5) \times 10^{-6}/° C$., particularly at zero as the best. According to the experiments conducted by the present inventors, no negative coefficient of thermal expansion has not been found. In this regard, off-track is similarly caused, also, in case where a magnetic tape has a negative coefficient of thermal expansion.

In the invention according the second aspect, a factor of a frequency (V/f) is added to the factor of $[\alpha/(Tw-Tr)]$ employed in the invention of the first aspect, and thus, the value of $[\alpha/(Tw-Tr)] \times (V/f)$ is set at 14 [s$^{-1}$] or less ($[\alpha/(Tw-Tr)] \times (V/f) \leq 14$ [s$^{-1}$]), provided that other constituents are the same as those of the invention of the first aspect. In this invention, the value of $[\alpha/(Tw-Tr)] \times (V/f)$ is preferably 8 [s$^{-1}$] or less, more preferably 6 [s$^{-1}$] or less, particularly zero as the best. This is because PES becomes lower in spite of an increase in the tape running speed, so that a decrease in reproduction output due to off-track lessens. The preferable ranges for the coefficients of humidity expansion and thermal expansion are the same as those in the invention of the first aspect.

In the invention according to the third aspect, there is provided a magnetic tape which satisfies both of the conditions employed in the invention of the first aspect and the invention of the second aspect. Thus, the value of $[\alpha/(Tw-Tr)]$ is 0.2 or less; the value of $[\alpha/(Tw-Tr)] \times (V/f)$ is 14 [s$^{-1}$] or less; the coefficient of humidity expansion in the tape-widthwise direction is within a range of $(0 \text{ to } 14) \times 10^{-6}/\%$ RH; and the coefficient of thermal expansion is within a range of $(0 \text{ to } 10) \times 10^{-6}/° C$.

In the invention according to the fourth aspect, the difference of [(recording track width)−(reproducing track width)] is set at 10 μm or less for the magnetic tape according to the invention of any of the first to the third aspects.

Furthermore, in a magnetic tape cartridge according to the present invention, a single reel having any of the magnetic tapes of the inventions of the first to the fourth aspects wound therearound is arranged in a box-shaped casing body, and the tracking of the magnetic tape is controlled by the servo signals recorded on the magnetic tape. In this case, the servo signals may be recorded on either the magnetic layer or the backcoat layer of the magnetic tape. Alternatively, the servo signals may be recorded as optical signals on the backcoat layer of the magnetic tape. Preferably, the signals magnetically recorded on the magnetic tape are reproduced with reproducing heads which comprise magnetoresistantce elements.

BRIEF DESCRIPTION OF DRAWINGS

FIGS. 1A to 1C illustrate examples of the lamination structures of magnetic tapes according to the present invention, in which FIG. 1A is a sectional view of a magnetic tape without an intermediate layer; FIG. 1B is a sectional view of a magnetic tape having an intermediate layer formed on one surface of a non-magnetic support; and FIG. 1C is a sectional view of a magnetic tape having intermediate layers formed on both surfaces of a non-magnetic support.

BEST EMBODIMENTS FOR CARRYING OUT THE INVENTION

Hereinafter, the present invention will be described in more detail.

<Lamination Structure of Magnetic Tape, and Coefficients of Humidity Expansion and Thermal Expansion of Constituent Materials>

Figure 1A:
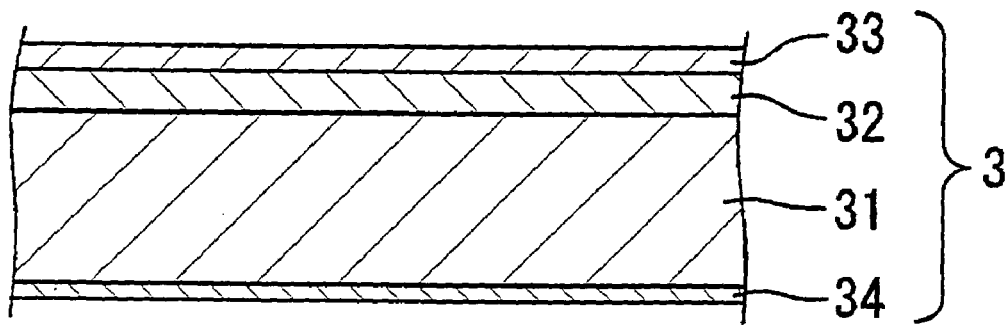
Figure 1B:
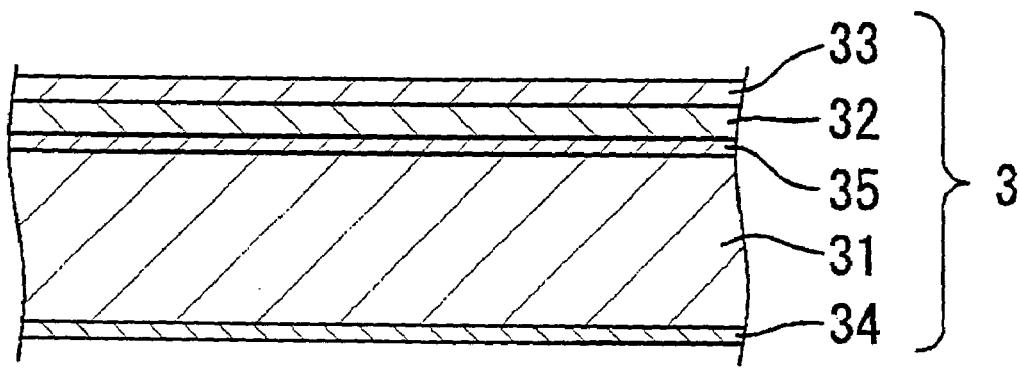
Figure 1C:
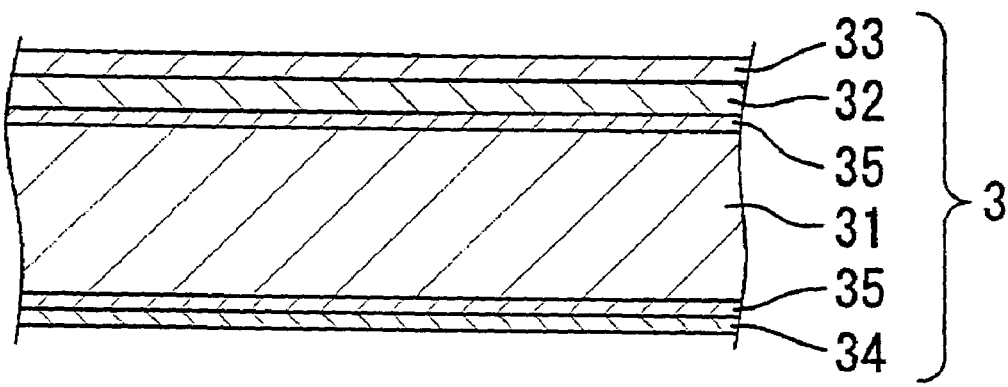

FIGS. 1A to 1C show examples of the lamination structures of magnetic tapes according to the present invention. In each of FIGS. 1A to 1C, the magnetic tape (3) comprises a non-magnetic support (31), a primer layer (32), a magnetic layer (33), a backcoat layer (34) and an intermediate layer (35) (except for the magnetic tape shown in FIG. 1A).

FIG. 1A shows an example of a magnetic tape (3) having no intermediate layer, in which a primer layer (32) and a magnetic layer (33) are laminated in this order on one surface of the non-magnetic support (31), and a backcoat layer (34) is formed on the other surface of the non-magnetic support (31). In this case, such a non-magnetic support (31) as described below is used: the non-magnetic support (31) has as small a coefficient of humidity expansion as possible and also a negative coefficient of thermal expansion in the tape widthwise direction, provided that the absolute value of the negative coefficient is large. For example, the non-magnetic support (31) has a coefficient of humidity expansion of $(0 \text{ to } 5) \times 10^{-6}/\%$ RH, and a coefficient of thermal expansion of $(-10 \text{ to } 0) \times 10^{-6}/°$ C. Then, a conventional primer layer (32), a magnetic layer (33) and a backcoat layer (34) may be formed on the respective surfaces of such a non-magnetic support (31). However, the differences in coefficient of humidity expansion and coefficient of thermal expansion (hereinafter, sometimes, collectively referred to as "coefficients of temperature/humidity expansion") between the non-magnetic support (31) and the primer layer (32) are large, and therefore, the bonding strength at the interface therebetween becomes weak, or the magnetic tape (3) is curved. To avoid these disadvantages, a part (20 to 50 wt. %) of a binder contained in the primer layer (32) formed on the non-magnetic support (31) is preferably substituted by a polyamideimide resin which has a coefficient of humidity expansion of $(10 \text{ to } 140) \times 10^{-6}/\%$ RH, a coefficient of thermal expansion of $(10 \text{ to } 70) \times 10^{-6}/°$ C., and a glass transition point of 200 to 350° C. A polyamideimide resin normally has a coefficient of humidity expansion and a coefficient of thermal expansion both lower than those of a vinyl chloride resin or a polyurethane resin which is conventionally used in the primer layer. Accordingly, the addition of the polyamideimide resin effectively decreases the difference in coefficients of temperature/humidity expansion between the non-magnetic support (31) and the primer layer (32).

FIG. 1B shows a magnetic tape in which an intermediate layer (35) is provided between a non-magnetic support (31) and a primer layer (32), and FIG. 1C shows a magnetic tape in which intermediate layers (35) are provided between a non-magnetic support (31) and a primer layer (32), and between the non-magnetic support (31) and a backcoat layer (34), respectively. The intermediate layer (35) is provided in order to improve the interlayer adhesion, for example, in case where the differences in coefficients of temperature/humidity expansion between the non-magnetic support (31) and an adjacent layer (the primer layer (32) or/and the backcoat layer (34)) are large. As the material of the intermediate layer (35), for example, a polyamideimide resin is preferably used, because the coefficients of temperature/humidity expansion of the polyamideimide resin are medium between those of the non-magnetic support and a conventional binder resin.

The primer layer or the backcoat layer may contain non-magnetic plate particles (e.g., the particles of cerium oxide, zirconium oxide, aluminum oxide, silicon oxide, and iron oxide) having an average particle size (the maximum diameter of each particle in the plate face direction) of 10 to 200 nm, preferably 10 to 100 nm. The addition of such non-magnetic plate particles to the primer layer or the backcoat layer makes it easy for the plate faces of the particles to array in parallel to the surface of a substrate because of their mechanical orientation, when the coating composition is applied thereto, and also effectively decreases the coefficient of thermal expansion or the coefficient of humidity expansion of the magnetic tape in the film surface direction, because the interaction of the plate particles in the plate face direction is strong.

<Structure of Magnetic Tape Cartridge>

Figure 2:
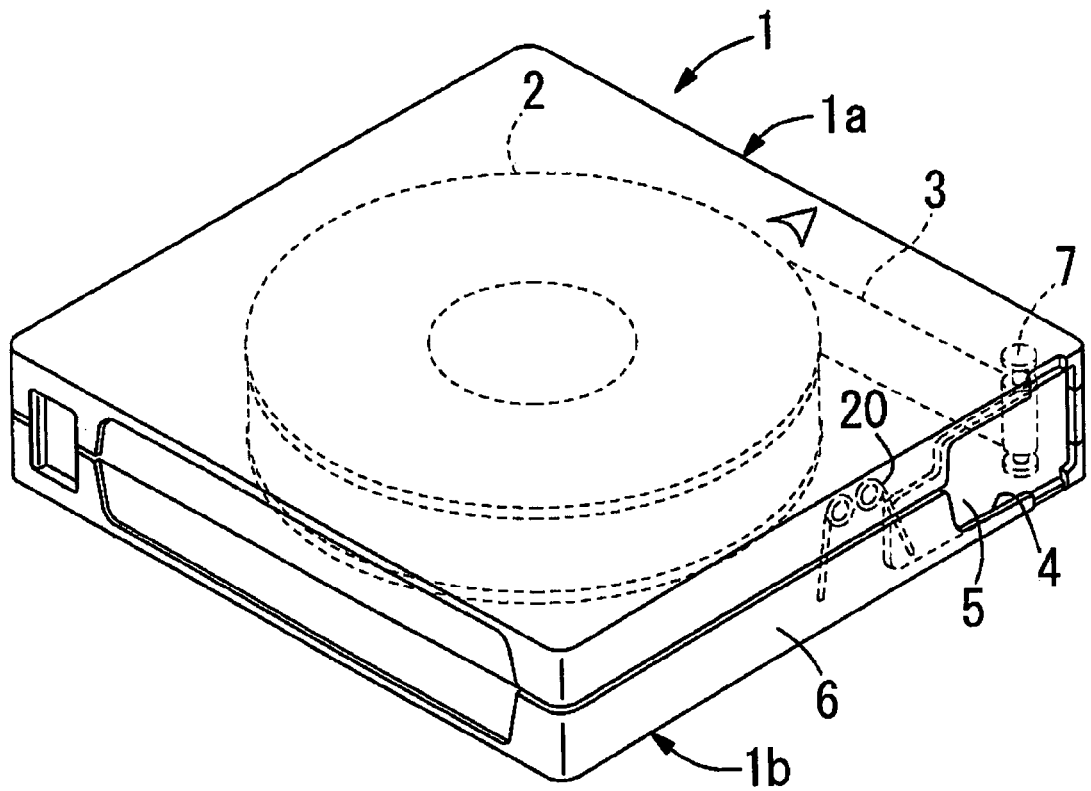
FIG. 2 is a perspective view of a magnetic tape cartridge according to the present invention, showing a general structure thereof.
Figure 3:
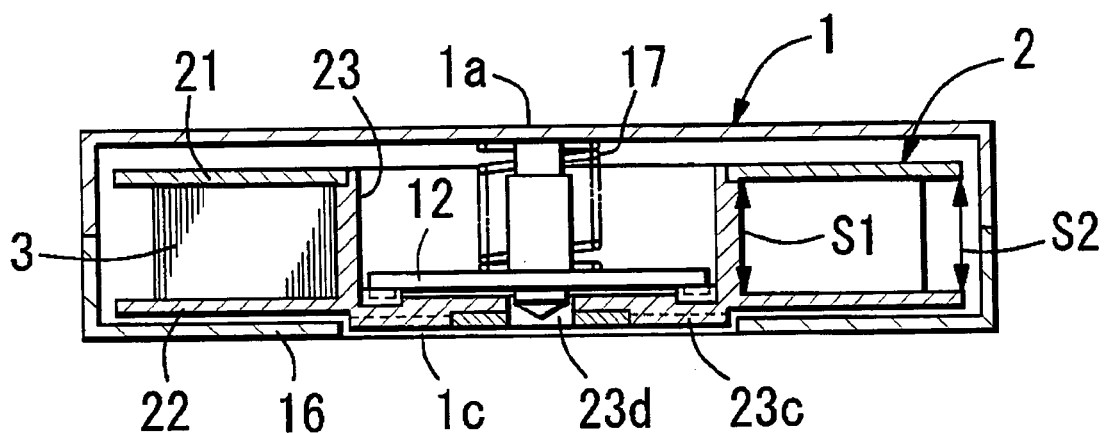
FIG. 3 is a sectional view of the magnetic tape cartridge according to the present invention, showing a partly simplified internal structure thereof.

FIG. 2 illustrates a structure of a magnetic tape cartridge according to the present invention, and FIG. 3 shows the internal structure thereof. As seen in FIG. 2, the magnetic tape cartridge comprises a box-shaped casing body (1) obtained by bonding the upper and lower casings (1a and 1b) to each other, one reel (2) arranged inside the casing body (1), and a magnetic tape (3) wound around the reel (2). A tape-drawing port (4) is opened on one side of the front wall (6) of the casing body (1), and the port (4) is opened or closed by a slidable door (5). A tape-drawing member (7) is combined to the end portion at which the magnetic tape (3) is drawn out, in order to draw out the magnetic tape (3) wound around the reel (2) from the casing. Numeral 20 in FIG. 2 refers to a door spring for forcing the door (5) to automatically move to a closing position.

As shown in FIG. 3, the reel (2) comprises an upper flange portion (21), a lower flange portion (22), and a winding shaft (23) which is formed integrally with the lower flange portion (22) and which is formed in the shape of a bottomed cylindrical body opened at the upper portion. The bottom wall (23c) of the winding shaft (23) is located over the inlet (1c) of the base wall of the casing through which a driving shaft is inserted into the casing. Gear teeth are formed on the outer periphery of the bottom wall (23c) of the winding shaft (23), and such gear teeth are to engage with a member of a tape-driving unit (a magnetically recording-reproducing unit). A bottom hole (23d) is formed at the center of the base wall (23c) of the winding shaft (23), and this hole (23d) is to allow an unlocking pin (not shown) of the tape-driving unit to enter the casing. Further, a reel-locking mechanism for preventing unnecessary rotation of the reel (2) is provided in the casing body (1). Numeral 12 in FIG. 3 refers to a braking button composing this reel-locking mechanism, and numeral 17 refers to a spring for forcing the braking button (12) downwardly in the figure.

The magnetic tape (3) arranged in the magnetic tape cartridge is tracked under the control of the servo signals recorded on the magnetic tape, while the position of one tape edge (3a) which is on the side of reference for the running of the tape being regulated toward the outward in the tape widthwise direction.

Figure 7:
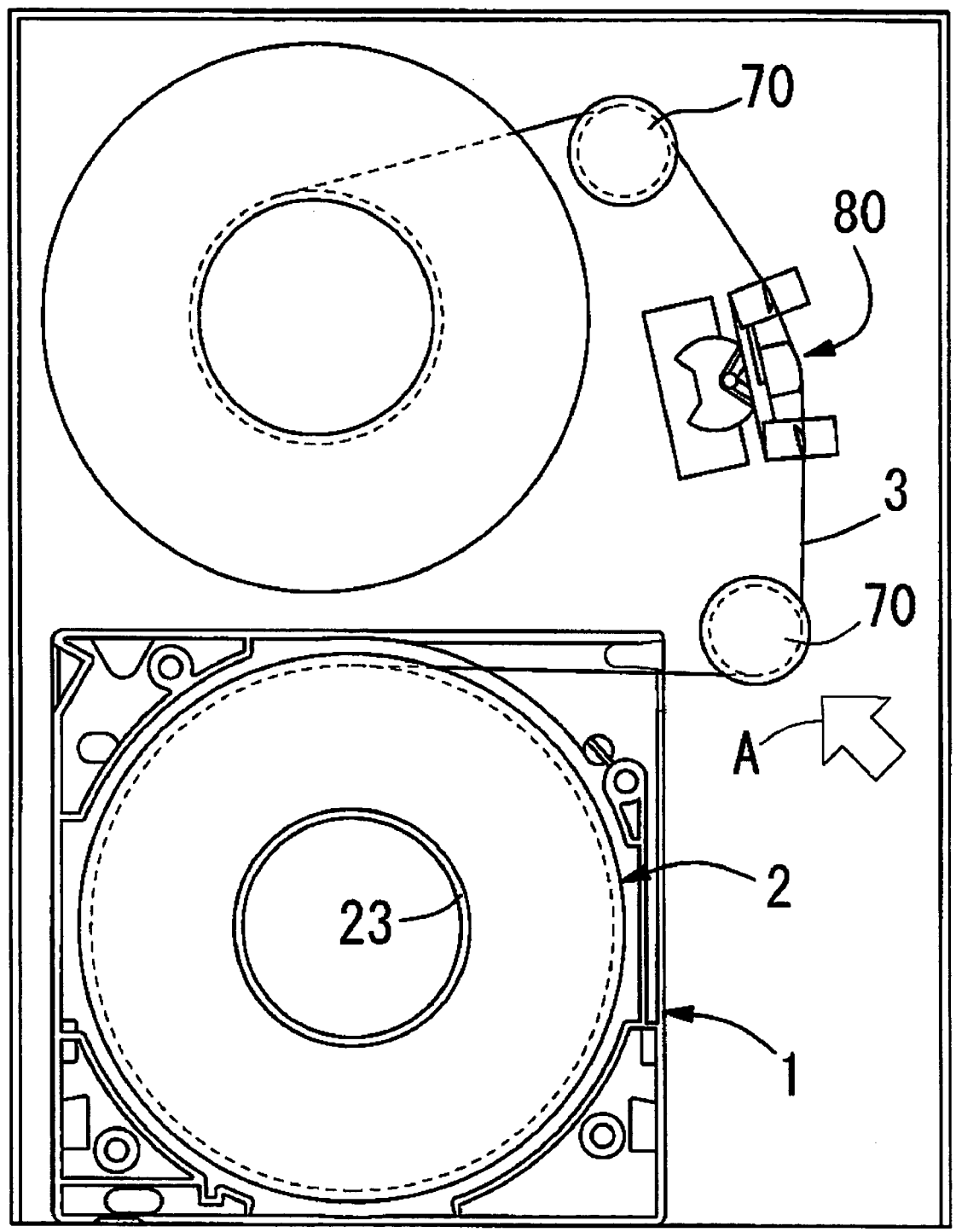
FIG. 7 is a plan view of a magnetically recording-reproducing unit (a tape-driving unit) for a magnetic tape cartridge.
Figure 8:
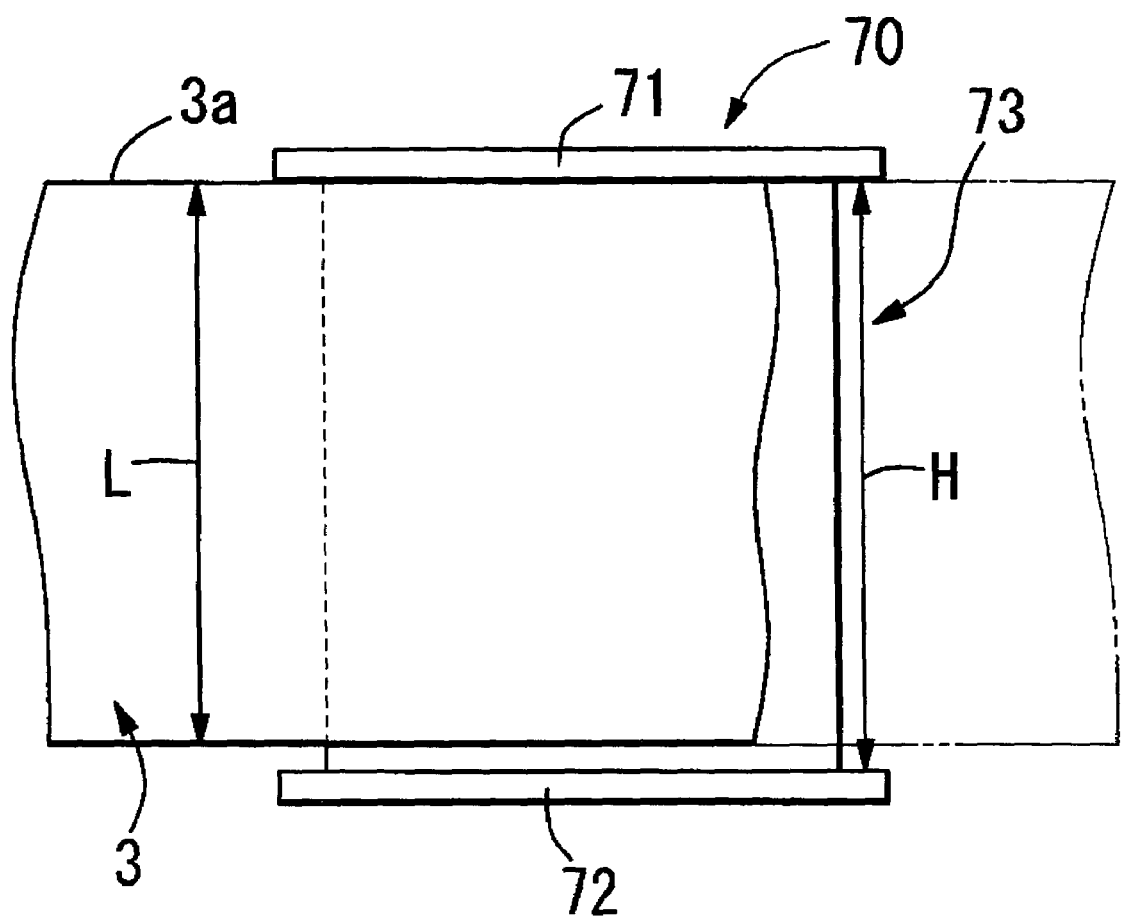
FIG. 8 is an enlarged side view of a part of the magnetically recording-reproducing unit, viewed from the direction of the allow A on FIG. 7, illustrating the magnetic tape running along a guide roller arranged in the magnetically recording-reproducing unit.
Figure 9:
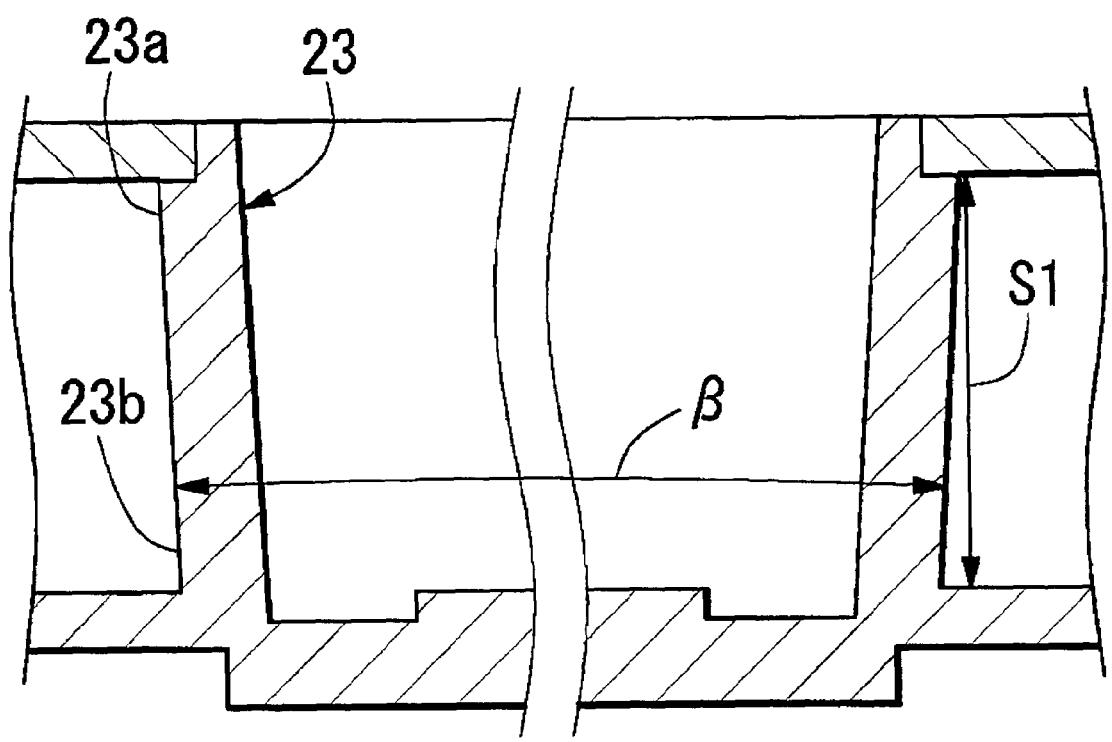
FIG. 9 is an enlarged view of the peripheral part of the winding shaft of the reel arranged in the magnetic tape cartridge shown in FIG. 2, from which a part of the reel is omitted.
Figure 10:
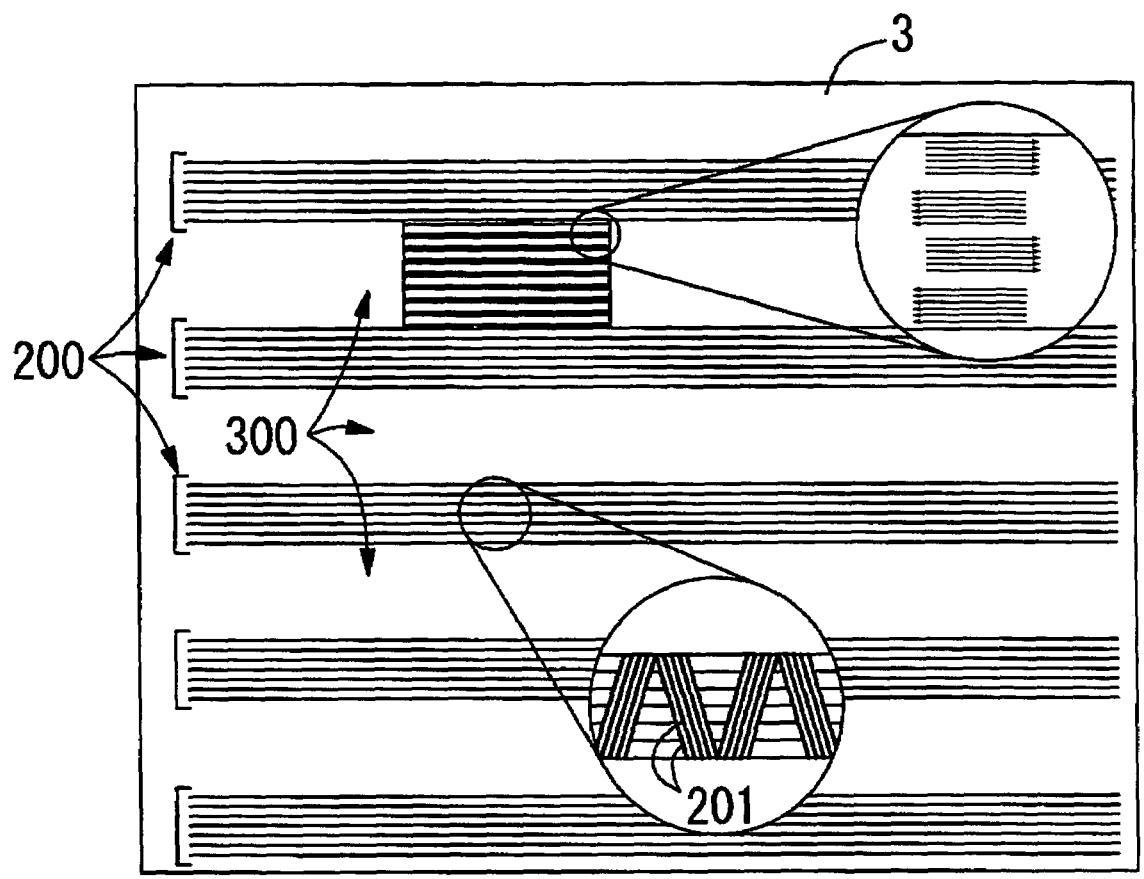
FIG. 10 is a diagram of a magnetic tape in which data tracks and servo bands are alternately formed on the magnetically recording surface (the magnetic layer) of the magnetic tape, illustrating an example of the track servo system applied to the magnetic tape.

In the reel (2), as shown in FIG. 9, the outer circumferential surface of the winding shaft (23) is tapered at an angle β of 0.1 to 1 degree, so that one end face (23a) of the winding shaft (23) on the side of the edge (3a) of the tape serving as the reference side for the running of the tape (see FIGS. 4 and 8) can have a larger diameter than that of the other end face (23b) of the winding shaft. In addition, the distance S1 between the inner surfaces of the flange portions which oppose to each other at a position just adjacent to the outer periphery of the winding shaft (23) and inside the inner circumference of the reel is set at a value within a range of the sum of "an upper limit of the width of the tape" and "0.204 to 0.224 mm", and the distance S2 between the inner surfaces of the flange portions which oppose to each other at a position inside the outer circumference of the reel is set at a value within a range of the sum of "an upper limit of the width of the tape" and "0.484 to 0.504 mm". This designing makes it possible to run the magnetic tape (3) in the magnetically recording-reproducing apparatus (the tape drive) as shown in FIG. 7 so that the tape edge (3a) can be surely run alongside the inner surface of the flange of the guide roller (70) (the surface serving as the reference side for the tape-running), with the result that very slight vibrations of the magnetic tape (3) in the widthwise direction can be suppressed or prevented as much as possible. Thus, the tracing of the servo signals can be performed in a good condition. To the same end, the curvature of the magnetic tape (3) is set at 2 mm or less per one meter of the tape, and also, it is desirable that the magnetic tape is curved on the side of the tape edge (3a) as the reference side for the running of the magnetic tape (3).

In the magnetically recording-reproducing apparatus shown in FIG. 7, guide rollers (70, 70) are arranged to run the magnetic tape (3) drawn out from the casing body (1) of the magnetic tape cartridge, along a predetermined route. In this figure, a head member (80) is arranged between the pair of guide rollers (70, 70). Numerals 71 and 72 in FIG. 8 refer to flanges which are provided at both end portions of each guide roller (70); 73, to a groove formed between both flanges (71) and (72); H, to the width of the groove; and L, to the width of the magnetic tape (3), provided that the width L of the magnetic tape (3) is smaller than the width H of the groove (L<H). In a magnetic tape cartridge including a magnetic tape (3) having a width of ½ inch, the distance S1 between the inner surfaces of the flange portions which oppose to each other inside the inner circumference of the reel is 12.860 to 12.880 mm, and the distance S2 between the inner surfaces of the flange portions which oppose to each other inside the outer circumference of the reel is 13.140 to 13.160 mm. A portion from the position at which the flange portions oppose to each other inside the inner circumference of the reel, to the position at which the flange portions oppose to each other inside the outer circumference of the reel, is substantially linear, which is found from the section of the reel taken along the radial direction of the reel (2).

In the above case, servo signals may be recorded as magnetic signals on the magnetically recording layer or the backcoat layer of the magnetic tape, or may be pits formed on the backcoat layer of the magnetic tape, or may be formed as optical signals from a material capable of absorbing light. In other words, the magnetic tape cartridge of the present invention can be applied to both of the magnetic servo system and the optical servo system.

To increase the recording density, preferably, the magnetically recorded signals formed on the magnetic tape in the magnetic tape cartridge of the present invention are reproduced with reproducing heads making use of magnetoresistance elements (MR heads). Furthermore, in case of the magnetic servo system, it is preferable that the servo signals are also reproduced with the MR heads.

<Structure of Edges of Magnetic Tape>

The present invention is intended to provide a magnetic tape which has a larger recording capacity and permits a higher access speed and transfer speed, particularly a magnetic tape which has an off-track margin, i.e., [(recording track width)−(reproducing track width)], of as narrow as 16 μm or less, and which can be driven to run at a speed of 4,000 mm/sec. or higher. In such a magnetic tape, the off-track margin is narrower and the tape-running speed is higher than the conventional magnetic tapes. Therefore, even such a slight fluctuation in the tape widthwise direction, which does not cause any dislocation from the tracks in the conventional magnetic tape, may possibly cause dislocation from the tracks in this magnetic tape. In view of prevention of an off-track, it is preferable to lessen the edge weave amount as much as possible. By taking into account the technical difficulties therefor, in other words, the possibility of realization, it is effective to restrict the edge weave amount within a specific range, in connection with the off-track margin, the tape-running speed and the cycle of the edge weave.

Figure 4:
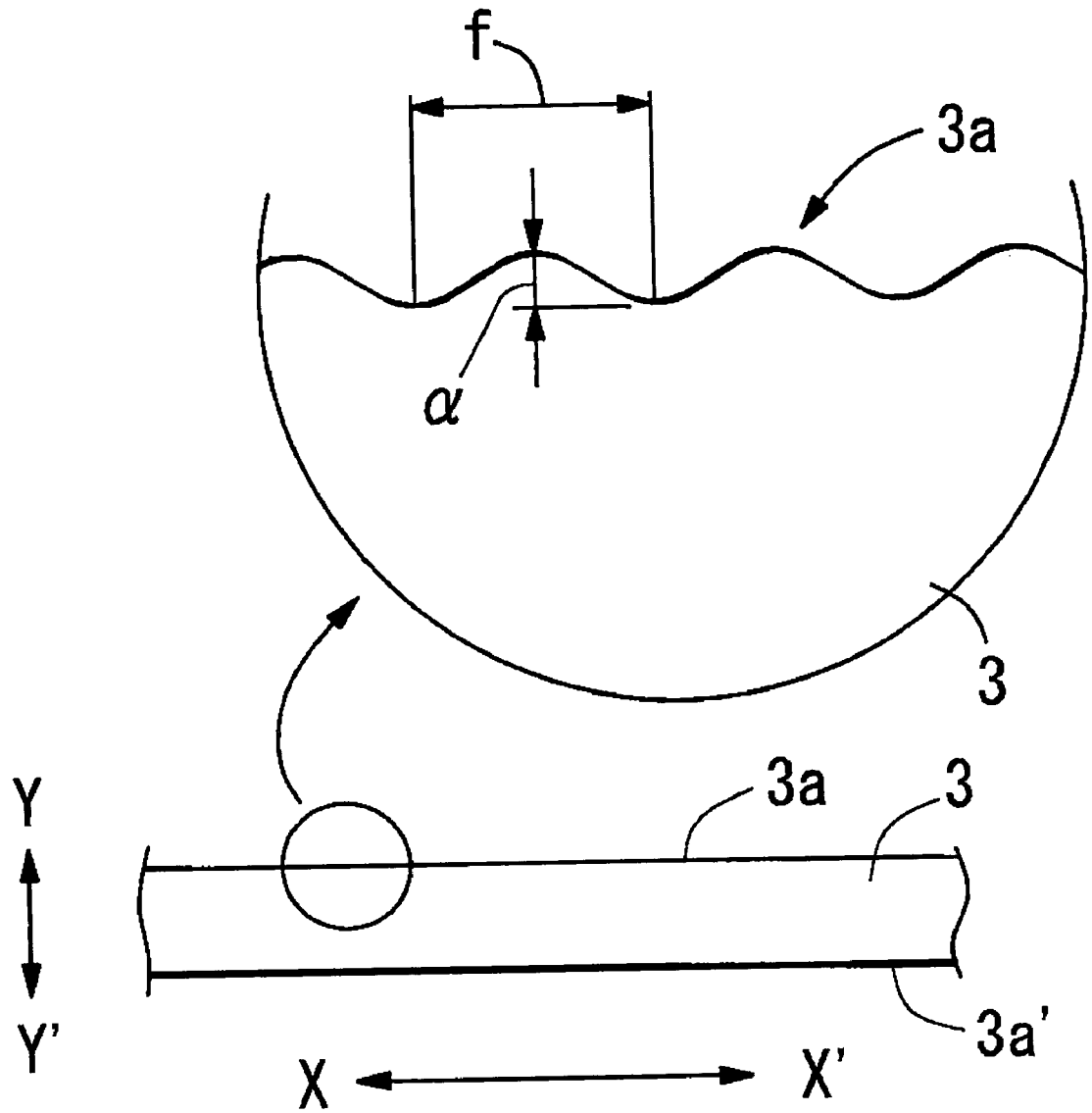
FIG. 4 is a plan view of a part of the magnetic tape, illustrating the edge weave formed on the magnetic tape in an enlarged state.

From such a viewpoint, in a magnetic tape (3) for use in a magnetic tape cartridge shown in FIGS. 2 and 3, the fluctuation amount of the tape in the widthwise direction (the direction Y–Y' in FIG. 4) because of the edge weave having a cycle of f formed on one of the edges (3a, 3a') of the tape as shown in FIG. 4, that is, the edge weave amount, is selected so as to satisfy the following equation (1) or (2):

$$[\alpha/(Tw-Tr)] \leq 0.2 \qquad (1)$$

$$[\alpha/(Tw-Tr)] \times (V/f) \leq 14 \ [s^{-1}] \qquad (2)$$

wherein

α: the amount of edge weave occurring on one edge as the reference side for the running of the tape, or the other edge of the tape (the edge weave amount) [unit: μm], Tw: the width of the recording track [unit: μm], Tr: the width of the reproducing track [unit: μm], V: the running speed of the magnetic tape [unit: mm/sec.], and f: the cycle of the edge weave [unit: mm].

In this regard, the running direction of the magnetic tape (3) is indicated by notations X–X' on FIG. 4.

In case where the difference of [(recording track width)−(reproducing track width)] is so small as 16 μm or less, particularly 10 μm or less, and where the tape-running speed is as fast as 4,000 mm/sec. or higher, off-track tends to occur. This is because, when the above value of [α/(Tw−Tr)] exceeds 0.09 and when dislocation from the tracks is caused by a change in the widthwise dimension of the tape in association with a change in humidity and/or temperature, the dislocation from the tracks due to the edge weave synergistically acts with the above dislocation. This phenomenon can be confirmed by the results of the evaluation of Examples and Comparative Examples which will be described later.

The occurrence of off-track also relates to the ratio of the tape-running speed V to the cycle (f) of the edge weave (V/f), that is, the frequency of the tape widthwise vibrations which are caused by the edge weave having a cycle of f while the tape is running. Also, the off-track tends to occur when the product of the ratio (V/f) and the value of [α/(Tw−Tr)] exceeds 5 [s$^{-1}$=Hz]. The cycle f [mm] of the edge weave which has an influence on the off-track of the magnetic tape (3) is normally f/V≦0.0125 [unit: sec.], in other words, 80≦V/f [s$^{-1}$=Hz]. Particularly when an edge weave with a cycle of f which satisfies the equation of 200≦V/f [s$^{-1}$] is present, the off-track amount becomes larger. This is because, since the magnet head array (not shown) provided in the tape drive has a large mass as a whole, the motion of the magnetic head array cannot follow the tracks on the magnetic tape, even though the cycle of the edge weave of the tape is relatively long, when the running speed V of the tape is more and more increased.

When the above off-track margin (Tw−Tr) is 16 μm or less ((Tw−Tr)≦16 [μm]), particularly 10 μm or less ((Tw−Tr) ≦10 [μm]) and also the tape running speed is 4,000 mm/sec. or lower (4,000≦V [mm/sec.]), off-track more and more occurs, as the difference (Tw−Tr) between the recording track width (Tw) and the reproducing track width (Tr) becomes smaller and smaller, and as the edge weave amount α becomes larger and larger. This is because the smaller difference (Tw−Tr) results in a smaller off-track margin, and because, the larger the edge weave amount, the larger the fluctuation of the magnetic tape in the widthwise direction becomes, while the tape is running. When the tape-running speed V is 4,000 mm/sec., the cycle f of the edge weave which has an influence on off-track is 50 mm or less, particularly 20 mm or less. When the amount α of the edge weave having this cycle is set at 2 μm or less, preferably 1 μm or less, the off-track amount becomes smaller, and thus, excellent servo tracking performance can be achieved. Particularly when the amount of fluctuation in the tape widthwise direction due to the edge weave having a cycle f of 20 mm or less is set at 1 μm or less, more excellent servo tracking performance can be achieved.

<Coefficient of Dynamic Friction>

Abnormal tape-running also causes off-track. Abnormal tape-running is caused by the following. (1) Unbalance between a coefficient of dynamic friction between the magnetic layer of a magnetic tape and the slider (material: alumina/titania/carbide (ALTIC)) and a coefficient of dynamic friction between the magnetic layer of the magnetic tape and the guide roller (material: aluminum) (since the coefficient of dynamic friction between the magnetic layer of the magnetic tape and aluminum is equal to the coefficient of dynamic friction between the magnetic layer of the magnetic tape and SUS, the latter coefficient is used in place of the former coefficient, because the measurement of the latter coefficient is established.); and (2) the shape of the servo signal-writing head is unsuitable.

Particularly when the coefficient of dynamic friction between the magnetic tape and the slider (ALTIC) is large, the off-track amount increases, because the magnetic tape moves in the widthwise direction while the magnetic head array moves in the widthwise direction of the magnetic tape. Therefore, it is necessary to set the coefficient of dynamic friction between the magnetic layer of the magnetic tape and the slider (ALTIC) at 0.35 or less, preferably within a range of from 0.1 to 0.3, more preferably within a range of 0.1 to 0.25. Generally, the coefficient of dynamic friction between the magnetic layer of the magnetic tape and SUS is from 0.1 to 0.3, and the coefficient of dynamic friction between the backcoat layer of the magnetic tape and SUS is from 0.1 to 0.3. It is difficult to make these coefficients of dynamic friction less than 0.10.

The influence of a position error signal (or PES) due to the abnormal tape-running can be suppressed, when the ratio of [(μ$_{msl}$)/(μ$_{mSUS}$)] is set at 0.7 to 1.3, wherein μ$_{msl}$ is a coefficient of dynamic friction between the magnetic layer of the magnetic tape and the slider material; and μ$_{mSUS}$ is a coefficient of dynamic friction between the magnetic layer of the magnetic tape and SUS. Furthermore, the off-track due to abnormal tape-running becomes smaller, when the ratio of [(μ$_{msl}$)/(μ$_{bSUS}$)] is set at 0.8 to 1.5, wherein μ$_{bSUS}$ is a coefficient of dynamic friction between the backcoat layer of the magnetic tape and SUS.

Hereinafter, the preferred examples of the elements of a magnetic tape according to the present invention will be explained in more detail.

<Non-Magnetic Support>

The coefficient of humidity expansion in the widthwise direction of a non-magnetic support is preferably within a range of (0 to 10)×10$^{-6}$/% RH, more preferably (0 to 6)×10$^{-6}$/% RH, still more preferably (0 to 5)×10$^{-6}$/% RH. If the coefficient of humidity expansion is outside the above range (particularly a negative coefficient of humidity expansion), adhesion failure may occurs at the interface between the non-magnetic support and an intermediate layer, the interface between the non-magnetic support and a primer layer or the interface between the non-magnetic support and a backcoat layer, or such an interface may peel.

The coefficient of thermal expansion in the widthwise direction of the non-magnetic support is preferably within a range of (−10 to +8)×10$^{-6}$/° C., more preferably (−10 to +5)×10$^{-6}$/° C., still more preferably (−10 to 0)×10$^{-6}$/° C. If the coefficient of thermal expansion is outside the above range, similarly, adhesion failure may occurs at the interface between the non-magnetic support and the intermediate layer, the interface between the non-magnetic support and the primer layer or the interface between the non-magnetic support and the backcoat layer, or such an interface may peel. When the coefficient of thermal expansion is within the above range, the amount of off-track decreases as the magnetic tape is run in a thermal cycle, and thus, the error rate in the servo performance decreases.

The thickness of the non-magnetic support is preferably 7.0 μm or less, more preferably from 2.0 to 7.0 μm. When the thickness of the non-magnetic support is less than 2 μm, it is difficult to form a film, and the strength of the resultant magnetic tape tends to lower. When the thickness of the non-magnetic support exceeds 7.0 μm, the total thickness of the magnetic tape increases so that the recording capacity per reel decreases.

The Young's modulus E of the non-magnetic support in the lengthwise direction depends on the thickness of the non-magnetic support, and it is usually at least 4.9 GPa (500 kg/mm$^2$), preferably at least 5.88 GPa (600 kg/mm$^2$), more preferably at least 6.86 GPa (700 kg/mm$^2$). When the Young's modulus of the support is less than 5.88 GPa (600 kg/mm$^2$), the strength of the magnetic tape tends to decrease or the feeding of the magnetic tape may become unstable. When the thickness T of the non-magnetic support is 5.0 μm or less, the rigidity (E.T$^3$) decreases, so that the tape strength lowers. Thus, the Young's modulus is preferably at least 6.86 GPa (700 kg/mm$^2$).

The ratio of Young's modulus MD in the lengthwise direction to Young's modulus TD in the widthwise direction (MD/TD) of the non-magnetic support is preferably from 0.1 to 1.8, more preferably from 0.3 to 1.7, still more preferably from 0.5 to 1.6. When this ratio is within the above range, the head touch is improved. As a material for the non-magnetic support, a polyethylene terephthalate film, a polyethylene naphthalate film, an aromatic polyamide film, an aromatic polyimide film, etc. are use. Among them, a polyethylene terephthalate film and polyethylene naphthalate film are preferable since they are inexpensive.

Generally, both the magnetic layer-forming surface and the backcoat layer-forming surface of the non-magnetic support have a center line average surface roughness Ra of 5.0 to 10 nm. In order to decrease the spacing loss by decreasing the center line average surface roughness Ra of the magnetic layer, a non-magnetic support which has a magnetic layer-forming surface having a center line average surface roughness Ra of 1.0 to 5.0 nm (the Ra of the backcoat layer-forming surface is 5.0 to 10 nm) is used. The non-magnetic support of this type is called dual type, which is made by laminating two types of non-magnetic supports.

<Primer Layer>

The thickness of a primer layer is preferably from 0.3 to 3.0 μm, more preferably from 0.5 to 2.1 μm. When the thickness of the primer layer is less than 0.3 μm, the durability of the magnetic recording medium may degrade. When the thickness of the primer layer exceeds 3.0 μm, the effect to improve the durability of the magnetic recording medium is saturated, and the total thickness of the magnetic tape increases, and the length of the tape per one reel decreases, so that the recording capacity decreases.

The primer layer may contain carbon black (CB) to improve the conductivity, or non-magnetic particles to control the viscosity of a paint and the stiffness of the magnetic tape.

Examples of the non-magnetic particles to be contained in the primer layer include titanium oxide, iron oxide, alumina (aluminum oxide), cerium oxide, zirconium oxide, silicon oxide, etc. Among them, iron oxide alone, or a mixture of iron oxide and alumina is preferable.

The surface roughness of the magnetic layer, which is formed on the primer layer by a wet-on-wet method, can be reduced, when the primer layer contains 15 to 35 wt. % of carbon black having a particle size of 10 to 100 nm, 35 to 83 wt. % of non-magnetic iron oxide having a major axis length of 0.05 to 0.20 μm and a minor axis length of 5 to 200 nm, or iron oxide having a particle size (an average particle size) of 10 to 200 nm, preferably 10 to 100 nm in a plate face direction, and optionally 0 to 20 wt. % of alumina having a particle size of 10 to 100 nm, or alumina having a particle size (average particle size) of 10 to 100 nm in a plate face direction, based on the weight of the total inorganic particles contained in the primer layer.

In general, the non-magnetic iron oxide has a needle shape. When particulate or amorphous non-magnetic iron oxide is used, its particle size is preferably from 5 to 200 nm.

The present invention does not always inhibit the addition of large size carbon black having a particle size of 100 nm or more, if the addition thereof does not impair the surface smoothness. In this case, the sum of the small size carbon black and the large size carbon black is preferably within the above-mentioned range.

Examples of carbon black to be added to the primer layer are acetylene black, furnace black, thermal black, etc. Such carbon black usually has a particle size of 5 to 200 nm, preferably 10 to 100 nm. When the particle size of carbon black is less than 10 nm, it may be difficult to disperse the carbon black particles in the primer layer since carbon black has a structure. When the particle size of carbon black exceeds 100 nm, the surface smoothness of the primer layer is impaired.

The amount of carbon black to be contained in the primer layer may depend on the particle size of carbon black, and it is preferably from 15 to 35 wt. %. When the amount of carbon black is less than 15 wt. %, the conductivity may not be sufficiently increased. When the amount of carbon black exceeds 35 wt. %, the conductivity-improving effect may saturate. More preferably, carbon black having a particle size of 15 to 80 nm is used in an amount of 15 to 35 wt. %, and still more preferably, carbon black having a particle size of 20 to 50 nm is used in an amount of 20 to 30 wt. %. When carbon black having the above particle size is used in the above-defined amount, the electrical resistance of the primer layer is decreased and the tape-feeding irregularity is lessened.

As the non-magnetic iron oxide to be added to the primer layer, there are given a needle-form iron oxide having a major axis length of 0.05 to 0.20 μm and a minor axis length (particle size) of 5 to 200 nm; a plate-form iron oxide having a particle size (average particle size) of 10 to 200 nm (preferably 10 to 100 nm) in a plate face direction; and a particulate or amorphous iron oxide having a particle size of 5 to 200 nm, more preferably 5 to 150 nm, still more preferably 5 to 100 nm. If the particle size (or the minor axis length in case of needle-form iron oxide) is 5 nm or less, the iron oxide particles are hard to uniformly disperse, while, if it exceeds 200 nm, the unevenness of the interface between the primer layer and the magnetic layer increases. For the same reason, it is preferable that the plate iron oxide has a particle size (average particle size) of 10 to 200 nm, preferably 10 to 100 nm in a plate face direction. In particular, the needle-form iron oxide particles are preferable, since the orientation in the magnetic layer can be improved. Further, the plate iron oxide particles are preferable, since the coefficient of temperature/humidity expansion of the magnetic tape becomes smaller.

The amount of the non-magnetic iron oxide to be added to the primer layer is preferably from 35 to 83 wt. %, more preferably from 40 to 80 wt. %, still more preferably from 50 to 75 wt. %. When the amount of the non-magnetic iron oxide is less than 35 wt. %, the effect to increase the strength of the primer layer is poor. When the amount of the nonmagnetic iron oxide exceeds 83 wt. %, the strength of the primer layer, on the contrary, tends to decrease.

The primer layer may contain alumina in addition to iron oxide. The particle size of alumina is preferably from 10 to 100 nm, more preferably from 20 to 100 nm, still more preferably from 30 to 100 nm. When the particle size of alumina is less than 10 nm, the alumina particles may not be uniformly dispersed in the primer layer. When the particle size of alumina exceeds 100 nm, the unevenness of the interface between the primer layer and the magnetic layer tends to increase. For the same reason, it is preferable that plate alumina has a particle size (average particle size) of 10 to 100 nm in a plate face direction. The amount of alumina to be added to the primer layer is usually from 0 to 20 wt. %, preferably from 2 to 10 wt. %, more preferably from 4 to 8 wt. %.

The primer layer may contain a resin such as a polyamide resin, a polyimide resin, a polyamideimide resin, etc. Among them, a polyamideimide resin is preferable because of the same reason as described above for the intermediate layer. For the same reason, the coefficient of humidity expansion of the polyamideimide resin is preferably $(10 \text{ to } 140) \times 10^-$ 6/% RH, more preferably (20 to 70)×10$^{-6}$/% RH. Similarly, the coefficient of thermal expansion thereof is preferably (10 to 70)×10$^{-6}$/° C., more preferably (20 to 60)×10$^{-6}$/° C. As will be described later, it is preferable for the polyamide-imide resin to have a functional group such as —SO$_3$M in order to improve the dispersibility of non-magnetic powder or the like.

Preferably, the polyamideimide resin has a glass transition point of 200 to 350° C., more preferably 250 to 320° C., because of the same reason described above. Similarly, the molecular weight of the polyamideimide resin is preferably 10,000 to 1,000,000.

<Lubricant>

A coating layer comprising a primer layer and a magnetic layer may contain a lubricant having a different function. Preferably, the primer layer contains 0.5 to 4.0 wt. % of a higher fatty acid and 0.2 to 3.0 wt. % of a higher fatty acid ester based on the weight of the entire powder components in the primer layer, because the coefficient of dynamic friction of the magnetic tape against the guide of the feeding system or the slider of the MR head can be decreased. When the amount of the higher fatty acid is less than 0.5 wt. %, the effect to decrease the coefficient of dynamic friction is insufficient. When the amount of the higher fatty acid exceeds 4.0 wt. %, the primer layer may be plasticized and thus the toughness of the primer layer may be lost. When the amount of the higher fatty acid ester is less than 0.2 wt. %, the effect to decrease the coefficient of friction is insufficient. When the amount of the higher fatty acid ester exceeds 3.0 wt. %, the amount of the higher fatty acid ester which migrates to the magnetic layer becomes too large, so that the magnetic tape may stick to the guide or the like of the feeding system.

It is preferable to use a fatty acid having 10 or more carbon atoms. Such a fatty acid may be a linear or branched fatty acid, or an isomer thereof such as a cis form or trans form. However, a linear fatty acid is preferable because of its excellent lubricity. Examples of such a fatty acid include lauric acid, myristic acid, stearic acid, palmitic acid, behenic acid, oleic acid, linoleic acid, etc. Among them, myristic acid, stearic acid and palmitic acid are preferable.

The coefficient of dynamic friction of the magnetic tape against the guide roller of the feeding system or the slider of the MR head can be decreased, when the magnetic layer contains 0.2 to 3.0 wt. % of a fatty acid amide and 0.2 to 3.0 wt. % of a higher fatty acid ester, based on the weight of the ferromagnetic powder. When the amount of the fatty acid amide is less than 0.2 wt. %, the coefficient of dynamic friction between the head slider and the magnetic layer tends to increase. When the amount of the fatty acid amide exceeds 3.0 wt. %, the fatty acid amide may bleed out and causes a defect such as dropout.

As the fatty acid amide, fatty acid amides each having at least 10 carbon atoms such as the amides of palmitic acid, stearic acid and the like can be used.

The addition of less than 0.2 wt. % of a higher fatty acid ester is insufficient to decrease the coefficient of dynamic friction, while the addition of 3.0 wt. % or more of a higher fatty acid ester gives an adverse influence such as adhesion of the magnetic tape to the guide of the feeding system. The intermigration of the lubricant between the magnetic layer and the primer layer is not always inhibited.

The coefficient of dynamic friction between the magnetic layer of the magnetic tape and the slider of the MR head should be 0.35 or less, preferably from 0.1 to 0.3, more preferably from 0.1 to 0.25, in order to lower PES. When this coefficient of dynamic friction exceeds 0.30, the spacing loss tends to arise due to the contamination of the slider. In addition, the off-track amount increases, because the magnetic tape moves in the widthwise direction when the magnetic head array is moved in the tape widthwise direction. The coefficient of dynamic friction of less than 0.10 is hardly realized.

The coefficient of dynamic friction between the magnetic layer and SUS is usually from 0.1 to 0.3, preferably from 0.10 to 0.25, more preferably from 0.12 to 0.20. When this coefficient of dynamic friction exceeds 0.25, the guide rollers may be easily contaminated. It is difficult to decrease this coefficient of dynamic friction to less than 0.10.

The ratio of $\mu_{msl}$ to $\mu_{mSUS}$ [($\mu_{msl}$)/($\mu_{mSUS}$)] is usually from 0.7 to 1.3, preferably from 0.8 to 1.2, wherein $\mu_{msl}$ is a coefficient of dynamic friction between the magnetic layer and the slider material; and $\mu_{mSUS}$ is a coefficient of dynamic friction between the magnetic layer and SUS. In this preferred range, dislocation from the tracks (off-track) due to abnormality in the feeding of the magnetic tape becomes smaller.

<Magnetic Layer>

The thickness of the magnetic layer is usually 0.3 μm or less, preferably from 0.01 to 0.3 μm, more preferably from 0.01 to 0.20 μm, still more preferably from 0.01 to 0.15 μm, particularly from 0.01 to 0.10 μm.

When the thickness of the magnetic layer is less than 0.01 μm, it is difficult to form a uniform magnetic layer. When the thickness of the magnetic layer exceeds 0.3 μm, the reproducing output may decrease due to the thickness loss, or the product (Brδ) of the residual magnetic flux density (Br) and the thickness (δ) becomes too large, so that the reproducing output tends to be skewed due to the saturation of the MR head.

The product of the residual magnetic flux density in the lengthwise direction and the thickness of the magnetic layer is preferably from 0.0018 to 0.06 μTm, more preferably from 0.0036 to 0.050 μTm. When this product is less than 0.0018 μTm, the reproducing output with the MR head may be low. When this product exceeds 0.06 μTm, the reproducing output with the MR head tends to be skewed. The use of a magnetic tape having such a magnetic layer is effective to shorten the recording wavelength, increase the reproducing output with the MR head, and decrease the skew in the reproducing output, so that, preferably, the ratio of output to noises can be increased.

The coercive force of the magnetic layer is preferably from 120 to 320 kA/m, more preferably from 140 to 320 kA/m, still more preferably from 160 to 320 kA/m. When the coercive force of the magnetic layer is less than 120 kA/m, the output is decreased by the demagnetizing field demagnetization, when the recording wavelength is shortened. When the coercive force exceeds 320 kA/m, the recording with the magnetic head may become difficult.

The center line average surface roughness Ra of the magnetic layer is usually 5 nm or less, preferably 3.2 nm or less, more preferably from 0.5 to 3.2 nm, still more preferably from 0.7 to 3.2 nm, and particularly from 0.7 to 2.9 nm. If the center line average surface roughness Ra of the magnetic layer is less than 0.5 nm, the feeding of the magnetic tape becomes unstable, while, if it exceeds 3.2 nm, a spacing loss occurs, and thereby the half width of reproduction output (PW50) becomes larger or the output lowers, so that the error rate becomes higher.

As the magnetic powder to be added to the magnetic layer, ferromagnetic iron metal powder such as Fe powder, Fe—Co powder and Fe—Nd—B powder, hexagonal barium ferrite powder, etc. may be used.

The coercive forces of the ferromagnetic iron metal powder and hexagonal barium ferrite powder are preferably from 120 to 320 kA/m. The saturation magnetization is preferably from 120 to 200 A·m²/kg (120 to 200 emu/g), more preferably from 130 to 180 A·m²/kg (130 to 180 emu/g) in case of the ferromagnetic iron metal powder. It is preferably from 50 to 70 A·m²/kg (50 to 70 emu/g) in case of the hexagonal barium ferrite powder. The magnetic characteristics of the magnetic layer and the ferromagnetic powder are measured with a sample-vibration type fluxmeter under an external magnetic field of 1.28 MA/m (16 kOe).

An average major axis length of the needle-shape ferromagnetic iron metal powder such as Fe powder and Fe—Co powder to be used in the magnetic tape of the present invention is preferably from 0.03 to 0.2 μm, more preferably from 0.03 to 0.18 μm, still more preferably from 0.04 to 0.15 μm, and particularly from 0.04 to 0.10 μm. When the average major axis length is less than 0.03 μm, the dispersion of the magnetic powder in the paint becomes hard since the agglomeration force of the magnetic powder increases. When the average major axis length exceeds 0.2 μm, the coercive force decreases, or the particle noise depending on the particle size becomes larger. For the same reason, the particle size of particulate ferromagnetic iron metal powder such as Fe—Nd—B powder is preferably from 10 to 100 nm, and the plate size of the hexagonal barium ferrite powder is preferably from 5 to 200 nm.

The above average major axis length and the above particle size are obtained by actually measuring the particle sizes on a photograph taken with a scanning electron microscope (SEM) and averaging the measured values of 100 particles.

The BET specific surface area of the ferromagnetic iron metal powder is preferably at least 35 m²/g, more preferably at least 40 m²/g, most preferably at least 50 m²/g. The BET specific surface area of the hexagonal barium ferrite powder is preferably 1 to 100 m²/g.

As a binder to be contained in the primer layer or the magnetic layer, the following can be used other than a polyamideimide resin: a combination of a polyurethane resin and at least one resin selected from the group consisting of a vinyl chloride resin, a vinyl chloride-vinyl acetate copolymer resin, a vinyl chloride-vinyl alcohol copolymer, a vinyl chloride-vinyl acetate-vinyl alcohol copolymer, a vinyl chloride-vinyl acetate-maleic anhydride copolymer, a vinyl chloride-hydroxyl group-containing alkyl acrylate copolymer, nitrocellulose (cellulose resins), and the like. Among them, a combination of a vinyl chloride-hydroxyl group-containing alkyl acrylate copolymer resin and a polyurethane resin is preferably used. Examples of the polyurethane resin include polyesterpolyurethane, polyetherpolyurethane, polyetherpolyesterpolyurethane, polycarbonatepolyurethane, polyestrepolycarbonatepolyurethane, etc.

Preferably, a binder such as a urethane resin which is a polymer having —COOH, —SO₃M, —OSO₃M, —P=O(OM)₃, —O—P=O(OM)₂ [wherein M is a hydrogen atom, an alkali metal base or an amine salt], —OH, —NR¹R², —N⁺R³R⁴R⁵ [wherein R¹, R², R³, R⁴ R⁵ are each independently a hydrogen atom or a hydrocarbon group], or an epoxy group as a functional group is used. The reason why such a binder is used is that, as mentioned above, the dispersibility of the magnetic powder, etc. is improved. When two or more resins are used in combination, it is preferable that the polarities of the functional groups of the resins are the same. In particular, the combination of resins both having —SO₃M groups is preferable.

The binder is used in an amount of 7 to 50 wt. parts, preferably from 10 to 35 wt. parts, based on 100 wt. parts of the ferromagnetic powder in case of the magnetic layer, or based on total 100 wt. parts of the carbon black and the non-magnetic powder in case of the primer layer. In particular, the best combination is 5 to 30 wt. parts of a vinyl chloride-based resin and 2 to 20 wt. parts of a polyurethane resin.

It is preferable to use the binder in combination with a thermally curable crosslinking agent which bonds with the functional groups in the binder to crosslink the same. Preferable examples of the crosslinking agent include isocyanates such as tolylene diisocyanate, hexamethylene diisocyanate, and isophorone diisocyanate; reaction products of these isocyanates with compounds having a plurality of hydroxyl groups such as trimethylolpropane; condensation products of these isocyanates, and the like. The crosslinking agent is used usually in an amount of 5 to 50 wt. parts, preferably 7 to 35 wt. parts, based on 100 wt. parts of the binder. When the amount of the crosslinking agent contained in the magnetic layer is about a half (30 to 60%) of that contained in the primer layer, the coefficient of dynamic friction of the magnetic layer against the slider of the MR head is decreased. When the amount of the crosslinking agent in the magnetic layer is less than 30% of that in the primer layer, the film strength of the magnetic layer tends to decrease, while, when it exceeds 60%, the LRT treatment conditions should be made severe to decrease the coefficient of dynamic friction against the slider, which leads to an increase of cost.

The magnetic layer may contain conventional carbon black (CB) to improve the conductivity and the surface lubricity. As this carbon black, acetylene black, furnace black, thermal black, etc. may be used. Carbon black having a particle size of 5 to 100 nm is generally used, and carbon black having a particle size of 10 to 100 nm is preferably used. When the particle size of carbon black is less than 5 nm, the dispersion of the carbon black particles is difficult. When the particle size of carbon black exceeds 100 nm, a large amount of carbon black should be added. In either case, the surface of the magnetic layer becomes rough and thus the output tends to decrease.

The amount of carbon black is preferably from 0.2 to 5 wt. %, more preferably from 0.5 to 4 wt. %, still more preferably from 0.5 to 3.5 wt. %, and particularly 0.5 to 3 wt. %, based on the weight of the ferromagnetic powder. When the amount of carbon black is less than 0.2 wt. %, the effect of carbon black is insufficient. When the amount of carbon black exceeds 5 wt. %, the surface of the magnetic layer becomes rough.

<Backcoat Layer>

To improve the tape-running performance, a conventional backcoat layer with a thickness of from 0.2 to 0.8 μm may be used. When the thickness of the backcoat layer is less than 0.2 μm, the effect to improve the tape-running performance is insufficient. When the thickness of the backcoat layer exceeds 0.8 μm, the total thickness of the magnetic tape increases, so that the recording capacity per one reel of the tape decreases.

The coefficient of dynamic friction between the backcoat layer and SUS is preferably from 0.10 to 0.30, more preferably from 0.10 to 0.25. When this coefficient of dynamic friction is less than 0.10, the magnetic tape excessively slips on the guide rollers, so that the running of the tape becomes unstable. When this coefficient of dynamic friction exceeds 0.30, the guide rollers tend to be contaminated. The ratio of $\mu_{msl}$ to $\mu_{bSUS}$ [$(\mu_{msl})/(\mu_{bSUS})$] is preferably from 0.8 to 1.5, more preferably from 0.9 to 1.4. Within this range, dislocation from the tracks (off-track) due to the tape-meandering is lessened.

As carbon black to be contained in the backcoat layer, acetylene black, furnace black, thermal black, etc. can be used. In general, carbon black with a small particle size and carbon black with a large particle size are used in combination. The particle size of small particle size carbon black is usually from 5 to 100 nm, preferably from 10 to 100 nm. When the particle size of small particle size carbon black is less than 10 nm, the dispersion thereof is difficult. When the particle size of small particle size carbon black exceeds 100 nm, a large amount of carbon black should be added. In either case, the surface of the backcoat layer becomes rough and thus the surface roughness of the backcoat layer may be transmitted to the magnetic layer (embossing).

When the large particle size black carbon having a particle size of 250 to 400 nm is used in an amount of 5 to 15 wt. % based on the weight of the small particle size carbon black, the surface of the backcoat is not roughened and the effect to improve the tape-running performance is increased. The total amount of the small particle size carbon black and the large particle size carbon black is preferably from 60 to 98 wt. %, more preferably from 70 to 95 wt. %, based on the weight of the inorganic powders in the backcoat layer. The center line average surface roughness Ra of the backcoat layer is preferably from 3 to 15 nm, more preferably from 4 to 10 nm.

To increase the strength of the backcoat layer, it is preferable to add iron oxide and alumina both having a particle size of 0.1 to 0.6 µm, preferably 0.2 to 0.5 µm, to the backcoat layer. The total amount of the iron oxide and the alumina is preferably from 2 to 40 wt. %, more preferably from 5 to 30 wt. %, based on the weight of the inorganic powder in the backcoat layer.

Further, the addition of non-magnetic plate oxide having a particle size of 10 to 200 nm, preferably 10 to 100 nm (cerium oxide, alumina, iron oxide, silicon oxide or zirconium oxide) is preferable, because the coefficients of temperature/humidity expansion of the magnetic tape are decreased.

As the binder to be contained in the backcoat layer, the same binders as those used in the magnetic layer and the primer layer can be used in addition to a polyamideimide resin. Among them, the combination of a cellulose resin and a polyurethane resin is preferably used so as to decrease the coefficient of friction and to improve the tape-running performance.

The amount of the binder in the backcoat layer is usually from 40 to 150 wt. parts, preferably from 50 to 120 wt. parts, more preferably from 60 to 110 wt. parts, still more preferably from 70 to 110 wt. parts, based on the total 100 wt. parts of the carbon black and the inorganic nonmagnetic powder in the backcoat layer. When the amount of the binder is less than 50 wt. parts, the strength of the backcoat layer is insufficient. When the amount of the binder exceeds 120 wt. parts, the coefficient of friction may become too large. Preferably, 30 to 70 wt. parts of a cellulose resin and 20 to 50 wt. parts of a polyurethane resin are used in combination. To cure the binder, a crosslinking agent such as a polyisocyanate compound is preferably used.

The crosslinking agent to be contained in the backcoat layer may be the same as those used in the magnetic layer and the primer layer. The amount of the crosslinking agent is usually from 10 to 50 wt. parts, preferably from 10 to 35 wt. parts, more preferably from 10 to 30 wt. parts, based on 100 wt. parts of the binder. When the amount of the crosslinking agent is less than 10 wt. parts, the film strength of the backcoat layer tends to decrease. When the amount of the crosslinking agent exceeds 35 wt. parts, the coefficient of dynamic friction of the backcoat layer against SUS increases.

The special-purpose backcoat layer, on which magnetic servo signals are recorded, may contain 30 to 60 wt. parts of the same ferromagnetic powder as is used in the magnetic layer, 40 to 70 wt. parts of the same carbon black as is used in the backcoat layer, and optionally 2 to 15 wt. parts of the same iron oxide and/or alumina as is used in the backcoat layer. As the binder, the same resin as is used in the backcoat layer is used in an amount of usually 40 to 150 wt. parts, preferably 50 to 120 wt. parts, based on total 100 wt. parts of the ferromagnetic powder, the carbon black and the non-magnetic inorganic powder. As the crosslinking agent, the crosslinking agent described above is used usually in an amount of 10 to 50 wt. parts per 100 wt. parts of the binder. For the same reason as described above for the magnetic layer, preferably, the coercive force is from 120 to 320 kA/m, and the product of the residual magnetic flux density Br and the thickness is from 0.018 to 0.06 µTm.

<LRT (Lapping/Rotary/Tissue) Treatment>

Before finishing the magnetic tape, the magnetic layer is subjected to a LRT treatment comprising lapping, rotary and tissue treatments, so as to optimize the surface smoothness, the coefficient of dynamic friction against the slider of the MR head and the cylinder material, the surface roughness and the shape of the surface. Thereby, the running performance of the magnetic tape is improved, and the spacing loss is reduced to improve the reproducing output with the MR head.

(1) Lapping:

An abrasive tape (lapping tape) is moved by the rotary roll at a constant rate (standard: 14.4 cm/min.) in a direction opposite to the tape-feeding direction (standard: 400 m/min.), and is brought into contact with the surface of the magnetic layer of the magnetic tape while being pressed down by the guide block. In this step, the magnetic tape is polished while the unwinding tension of the magnetic tape and the tension of the lapping tape being maintained constant (standard: 100 g and 250 g, respectively).

The abrasive tape (lapping tape) used in this step may be an abrasive tape (lapping tape) with fine abrasive particles such as M20000, WA10000 or K10000. It is possible to use an abrasive wheel (lapping wheel) in place of or in combination with the abrasive tape (lapping tape). In case where frequent replacement is necessary, the abrasive tape (lapping tape) alone is used.

(2) Rotary Treatment

A rotary wheel having an air-bleeding groove (standard: width of 1 inch (25.4 mm); diameter of 60 mm; air-bleeding groove width of 2 mm; and groove angle of 45 degrees, manufactured by KYOWA SEIKO Co., Ltd.) is rotated at a constant revolution rate (usually 200 to 3,000 rpm; standard: 1,100 rpm) in a direction opposite to the feeding direction of the magnetic tape, and is allowed to be in contact with the magnetic layer of the magnetic tape at a constant contact angle (standard: 90 degrees). Thus, the surface of the magnetic layer is treated.

(3) Tissue Treatment

Tissues (woven fabrics, for example, Traysee manufactured by Toray) are fed at a constant rate (standard: 14.0 mm/min.) by rotary bars, in a direction opposite to the feeding direction of the magnetic tape, so as to clean the surface of the backcoat layer and the surface of the magnetic layer of the magnetic tape, respectively.

EXAMPLES

The present invention will be explained in detail by way of the following Examples, which do not limit the scope of the invention in any way. In Examples and Comparative Examples, "parts" are "wt. parts", unless otherwise specified.

Example 1

| <Components of Paint for Primer Layer> | |
|---|---|
| (1) | |
| Iron Oxide powder (average particle size: 0.11 × 0.02 μm) | 68 parts |
| α-Alumina (average particle size: 0.07 μm) | 8 parts |
| Carbon black (average particle size: 25 nm; oil absorption: 55 g/cc) | 24 parts |
| Stearic acid (lubricant) | 2.0 parts |
| Vinyl chloride-hydroxypropyl acrylate copolymer (—SO$_3$Na group content: 0.7 × 10$^{-4}$ eq./g) | 8.8 parts |
| Pollyamideimide resin (Tg: 260° C., coefficient of humidity expansion = 120 × 10$^{-6}$/% RH, coefficient of thermal expansion = 57 × 10$^{-6}$/° C.; a 25 mass % solution in ethanol/toluene (1/1)) | 4.4 parts |
| Cyclohexanone | 25 parts |
| Methyl ethyl ketone | 40 parts |
| Toluene | 10 parts |
| (2) | |
| Butyl stearate (lubricant) | 1 part |
| Cyclohexanone | 70 parts |
| Methyl ethyl ketone | 50 parts |
| Toluene | 20 parts |
| (3) | |
| Polyisocyanate (crosslinking agent, Colonate L manufactured by Nippon Polyurethane) | 2.0 parts |
| Cyclohexanone | 10 parts |
| Methyl ethyl ketone | 15 parts |
| Toluene | 10 parts |
| <Components of Paint for Magnetic Layer> | |
| (1) | |
| Ferromagnetic iron-based metal powder [Co/Fe: 25 wt. %, Y/Fe: 9.3 wt. %, Al/Fe: 3.5 wt. %, Ca/Fe: 0 wt. %; σs: 155 A·m$^2$/kg, Hc: 188.2 kA/m, pH: 9.4, average major axis length: 0.10 μm] | 100 parts |
| Vinyl chloride-hydroxypropyl acrylate copolymer (—SO$_3$Na group content: 0.7 × 10$^{-4}$ eq./g) | 12.3 parts |
| Polyesterpolyurethane resin (—SO$_3$Na group content: 1.0 × 10$^{-4}$ eq./g) | 5.5 parts |
| α-Alumina (average particle size: 0.12 μm) | 8 parts |
| α-Alumin (average particle size: 0.07 μm) | 2 parts |
| Carbon black (average particle size: 75 nm; and DBP oil absorption: 72 cc/100 g) | 1.0 part |
| Methyl acid phosphate | 2 parts |
| Palmitic acid amide | 1.5 parts |
| n-Butyl stearate | 1.0 part |
| Tetrahydrofuran | 65 parts |
| Methyl ethyl ketone | 245 parts |
| Toluene | 85 parts |
| (2) | |
| Polyisocyanate (crosslinking agent, Colonate L manufatired by Nippon Polyurethane Co., Ltd.) | 2.0 parts |
| Cyclohexanone | 167 parts |

A paint for primer layer was prepared by kneading the components of Group (1) with a kneader, adding the components of Group (2) to the mixture and stirring them, dispersing the mixed components with a sand mill in a residence time of 60 minutes, and adding the components of Group (3), followed by stirring and filtering the mixture.

Separately, a magnetic paint was prepared by kneading the components of Group (1) with a kneader, dispersing the mixture with a sand mill in a residence time of 45 minutes, and adding the components of Group (2), followed by stirring and filtering the dispersion.

The paint for primer layer was applied on a non-magnetic support made of a polyethylene naphthalate film (PEN manufactured by TEIJIN, thickness of 6.2 μm, coefficient of humidity expansion=5.6×10$^{-6}$/% RH, coefficient of thermal expansion=−7.4×10$^{-6}$/° C., MD=6.50 GPa, MD/TD=0.54) so that the primer layer could have a thickness of 1.8 μm after dried and calendered. Then, the paint for magnetic layer was applied on the primer layer by a wet-on-wet method so that the magnetic layer could have a thickness of 0.15 μm after the magnetic paint layer had been oriented in a magnetic field, dried and calendered. After the orientation in the magnetic field, the magnetic layer was dried with a drier to obtain a magnetic sheet. The orientation in the magnetic field was carried out by arranging N—N opposed magnets (5 kG) in front of the drier, and arranging, in the drier, two pairs of N—N opposed magnets (5 kG) at an interval of 50 cm and at a position 75 cm before a position where the dryness of the layer is felt by one's fingers. The coating rate was 100 m/min.

| <Components of Paint for Backcoat Layer> | |
|---|---|
| Carbon black (particle size: 25 nm) | 80 parts |
| Carbon black (particle size: 370 nm) | 10 parts |
| Iron oxide (average major axis length: 0.4 μm; average axial ration (major axis length/minor axis length: about 10) | 10 parts |
| Nirocellulose | 44 parts |
| Polyurethane resin (containing SO$_3$Na groups) | 30 parts |
| Cyclohexanone | 260 parts |
| Toluene | 260 parts |
| Methyl ethyl ketone | 525 parts |

The components of a paint for backcoat layer were dispersed with a sand mill in a residence time of 45 minutes and a polyisocyanate as a crosslinking agent (Colonate L manufactured by Nippon Polyurethane) (13 parts) was added to the mixture to obtain a paint for backcoat layer. After filtration, the paint was coated on a surface of the magnetic sheet opposite to the magnetic layer so that the resultant backcoat layer could have a thickness of 0.5 μm after dried and calendered, and then, the backcoat layer was dried to finish the magnetic sheet.

The magnetic sheet, thus obtained, was planished by seven-stage calendering using metal rolls, at a temperature of 100° C. under a linear pressure of 150 kg/cm, and wound around a core and aged at 70° C. for 72 hours.

<Slitting Treatment>

Figure 5:
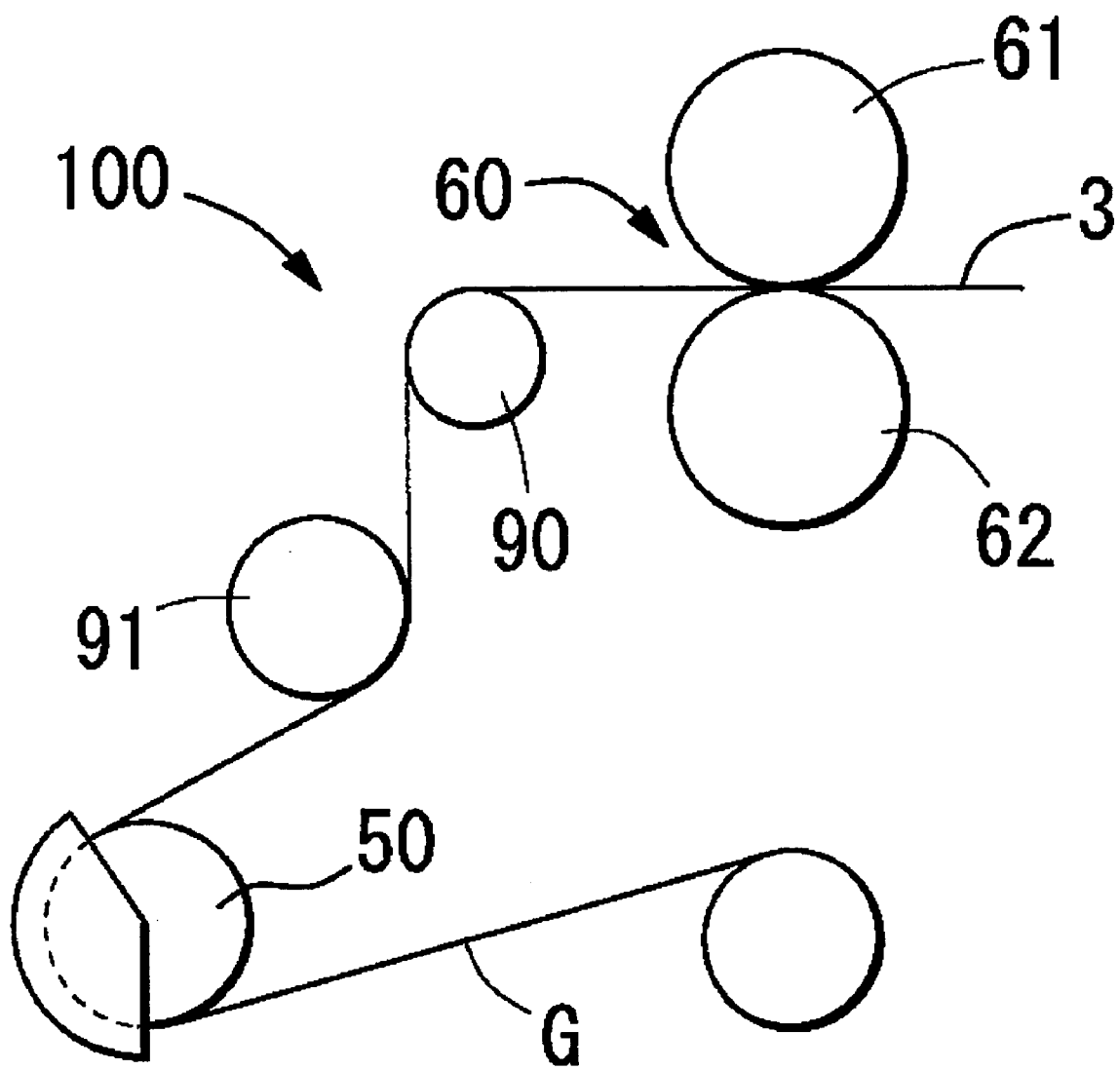
FIG. 5 schematically illustrates a partly simplified slitting system used for slitting a magnetic sheet in Examples of the present invention.
Figure 6:
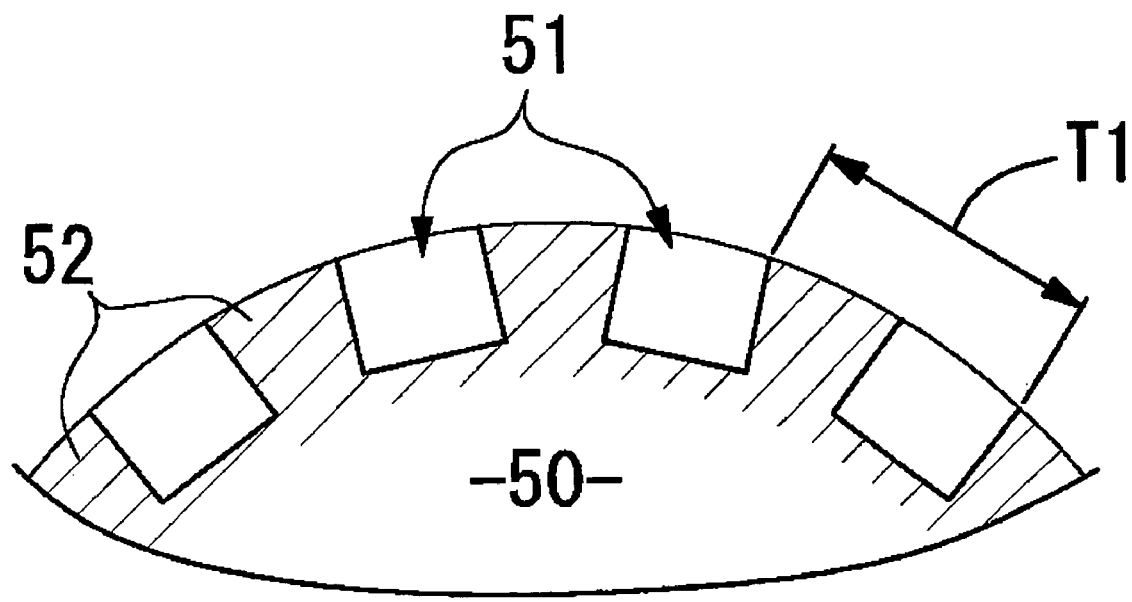
FIG. 6 is a partial sectional view of a tension cut roller arranged in the slitting system, schematically illustrating a part of the sucking portions.

Next, the slitting system (100) shown in FIG. 5 was used to slit the magnetic sheet G into a plurality of magnetic tapes (3) with a width of ½ in. Numeral 60 in FIG. 5 refers to a cutter-driving section; numerals 61 and 62 refer to upper and lower groups of cutters which are driven to rotate in directions opposite to each other; numerals 90 and 91 refer to guides arranged along a route of feeding the magnetic sheet G. FIG. 6 is an enlarged sectional view of the sucking section of the tension cut roller (50) shown in FIG. 5. The sucking section comprises sucking portions (51) which are communicated with a suction source (not shown) to suck the magnetic sheet, and tape-contacting portions (52) which contact the magnetic sheet at their outer peripheries. The sucking portions (51) and the tape-contacting portions (52) are arranged alternately and at regular intervals along the outer circumferential surface of the tension cut roller (50). As seen in FIG. 6, the distance in the circumferential direction from the rear end of one sucking portion (51) to the rear end of the next sucking portion (51), in other words, the cycle TI of the sucking portions (51) is 13.5 mm. The sucking portions (51) are packed with a porous metal material to provide mesh sucking portions. The slitting system (100) equipped with the above tension cut roller (50) was used to slit the magnetic sheet G under the conditions of a sucking pressure of $1.33 \times 10^4$ Pa (100 mmHg) and a winding angle of 188 degrees at which the magnetic sheet G was wound around the tension cut roller (50). Although not shown herein, the power-transmitting unit for transmitting the power from the driving motor to the cutter-driving section (60) shown in FIG. 5 employed a flat belt as the driving belt, and a rubber coupling as the coupling so as to inhibit the transmission of the vibrations from the driving motor. Then, a LRT treatment was carried out under the following conditions.

<LRT (Lapping/Rotary/Tissue) Treatment>

(1) Lapping

An abrasive tape (lapping tape) was fed by a rotary roll at a rate of 14.4 cm/min. in a direction opposite to the feeding direction of the magnetic tape (400 m/min.), and was pressed down from above by the guide block (4) to be brought into contact with the surface of the magnetic layer of the magnetic tape. In this step, the magnetic tape was polished while the unwinding tension of the magnetic tape being maintained at 100 g and the tension of the lapping tape, at 250 g.

(2) Rotary Aluminum Wheel Treatment

An aluminum rotary wheel which had a width of 25.4 mm and a diameter of 60 mm and had an air-bleeding groove with a width of 2 mm (the groove angle of 45 degrees, manufactured by KYOWA SEIKO Co., Ltd.;), was rotated at a revolution rate of 1,100 rpm in a direction opposite to the feeding direction of the magnetic tape, while being in contact with the magnetic layer of the magnetic tape at a contact angle of 90 degrees. Thus, the surface of the magnetic layer was treated.

(3) Tissue Treatment

The tissues (woven fabrics: Traysee manufactured by Toray) were fed at a rate of 14.0 mm/min. in a direction opposite to the feeding direction of the magnetic tape by rotary bars to clean the surfaces of the backcoat layer and the magnetic layer.

Magnetic servo signals were written on the magnetic layer of the magnetic tape at a rate of 4 m/sec. (4,000 mm/sec.), using a servo writer (Hitachi Maxell), and this magnetic tape was wound around a reel and set in a casing body. Thus, a magnetic tape cartridge for use in a computer shown in FIGS. 2 and 3 was provided.

The reel (2) used in this cartridge included a winding shaft (23) whose outer circumferential surface was tapered at a taper angle (β) of 0.5 degrees so that the diameter of the upper end face thereof on the side of the edge of the tape as the reference side for the running of the tape could be larger. The distance S1 between the inner surfaces of the flange portions at a position inside the inner circumference of the reel was +0.214 mm relative to 12.656 mm, the upper limit of the width (L) of the magnetic tape; and the distance S2 between the inner surfaces of the flange portions at a position inside the outer circumference of the reel was +0.494 mm relative to the upper limit of the width of the magnetic tape.

Example 2

A magnetic tape and a magnetic tape cartridge were produced in the same manner as in Example 1, except that the recording track width (Tw) was changed from 20 μm (Example 1) to 27.5 μm.

Examples 3 to 9 and Comparative Examples 1 to 5

Magnetic tapes and magnetic tape cartridges for use in computers of Examples 3 to 9 and Comparative Examples 1 to 5 were produced in the same manner as in Example 1, except that some of the conditions were changed as indicated in Tables 1 to 11.

In Tables 1 to 3, the conditions for the primer layers, the magnetic layers and the backcoat layers, and the slitting conditions, indicated by "U-1" to "U-4", "M", "B-1" to "B-3", and "S-1" to "S-3", are shown in Tables 6 to 11.

The term "13.5 mm pitch" seen in Table 11 means that the sucking portions are arranged at 13.5 mm intervals alongside the outer circumferential face of the tension cut roller (50), however, that they are not mesh suctions having porous metals embedded therein as employed in Example 1, but are ordinary ones having holes therein.

The plate iron oxide particles and the plate alumina particles shown in Tables 7 and 10 were prepared as follows.

<Preparation of Plate Iron Oxide Particles>

Sodium hydroxide (375 moles) and 2-aminoethanol (50 L) were dissolved in water (400 L) to form an aqueous alkaline solution. Separately from this aqueous alkaline solution, ferric chloride (III) heptahydrate (37 moles) was dissolved in water (200 L). While the resultant aqueous ferric chloride solution and the aqueous alkaline solution were maintained at 12° C., the aqueous ferric chloride solution was dropwise added to the aqueous alkaline solution to form a precipitate containing iron hydroxide. The pH at this stage was 11.3. The precipitate was kept standing at a room temperature for about 20 hours, and then was washed with water (in an amount 1,000 times larger than the precipitate). The resulting supernatant was removed, and an aqueous sodium hydroxide solution was added to adjust the pH of the precipitate to 11.3. Then, it was charged in an autoclave and then subjected to a hydrothermal treatment at 150° C. for 2 hours.

By the hydrothermal treatment, plate goethite (α-FeOOH) was obtained. Further, an aqueous sodium silicate solution was added, in an amount of 1 wt. % in terms of $SiO_2$, to this goethite under stirring, and hydrochloric acid was added to adjust the pH of the mixture to 7.3. Thus, the $SiO_2$ coating treatment was done. The resultant plate particles were filtered, dried, and treated by heating in air at 600° C. for one hour, to obtain α-iron oxide particles. The α-iron oxide particles were treated by heating, and washed with water using an ultrasonic dispersing machine so as to remove the unreacted material and residues. Then, the α-iron oxide particles were filtered and dried.

The X-ray diffraction spectra of the resultant α-iron oxide particles were measured. As a result, the spectrum corresponding to α-hematite was observed. The shapes of the particles were observed with a transmission electron microscope: the particle sizes (the maximum diameters of the respective particles) of 100 particles were measured, and it was found that they were hexagonal plate particles having an average particle size of 50 nm.

<Preparation of Plate Alumina Particles>

Sodium hydroxide (375 moles) and 2-aminoethanol (50 L) were dissolved in water (400 L) to form an aqueous alkaline solution. Separately from this aqueous alkaline solution, aluminum chloride (III) heptahydrate (37 moles) was dissolved in water (200 L). The resultant aqueous aluminum chloride solution was dropwise added to the aqueous alkaline solution to form a precipitate containing aluminum hydroxide. Then, hydrochloric acid was dropwise added to the precipitate to adjust the pH to 10.2. The precipitate in the form of a suspension was aged for 20 hours, and then was washed with water (in an amount 1,000 times larger than the precipitate). The resulting supernatant was removed, and the pH of the precipitate in the form of the suspension was again adjusted to 10.0, using an aqueous sodium hydroxide solution. The suspension of the precipitate was charged in an autoclave to be subjected to a hydrothermal treatment at 200° C. for 2 hours.

The resultant product was filtered and dried at 90° C. in an air. The dried product was slightly crushed in a mortar, and treated by heating at 600° C. in an air for one hour to obtain aluminum oxide particles. The resultant particles were treated by heating and washed with water, using an ultrasonic dispersing machine so as to remove the unreacted matters and the residues therefrom. The particles were then filtered and dried.

The X-ray diffraction spectra of the resultant aluminum oxide particles were measured. As a result, the spectrum corresponding to γ-alumina was observed. The shapes of the particles were observed with a transmission electron microscope. As a result, it was found that they are square plate particles having a particle size distribution of 30 to 50 nm. The resultant aluminum oxide particles were further treated by heating at 1,250° C. in an air for one hour. The X-ray diffraction spectra of the resultant particles were measured. As a result, the spectrum corresponding to α-alumina was observed. The shapes of the particles were further observed with a transmission electron microscope: the particle sizes (the maximum diameters) of 100 particles were measured, and it was found that they were square plate particles having an average particle size of 50 nm.

TABLE 1

|  | Ex. 1 | Ex. 2 | Ex. 3 |
|---|---|---|---|
| Non-magnetic support |  |  |  |
| Material | PEN | PEN | PEN |
| Thickness (μm) | 6.2 | 6.2 | 6.2 |
| Coefficient of humidity expansion in widthwise direction ($\times 10^{-6}$/% RH) | 5.6 | 5.6 | 5.6 |
| Coefficient of thermal expansion in widthwise direction ($\times 10^{-6}$/° C.) | −7.4 | −7.4 | −7.4 |
| Coefficient of humidity expansion in lengthwise direction ($\times 10^{-6}$/% RH) | 11.8 | 11.8 | 11.8 |

TABLE 1-continued

|  | Ex. 1 | Ex. 2 | Ex. 3 |
|---|---|---|---|
| Coefficient of thermal expansion in lengthwise direction ($\times 10^{-6}$/° C.) | 4.1 | 4.1 | 4.1 |
| MD (Gpa) | 6.5 | 6.5 | 6.5 |
| MD/TD | 0.54 | 0.54 | 0.54 |
| Primer layer | U-1 | U-1 | U-2 |
| Magnetic layer | M | M | M |
| Backcoat layer | B-1 | B-1 | B-1 |
| Tape |  |  |  |
| Total thickness (μm) | 8.65 | 8.65 | 8.65 |
| Coefficient of humidity expansion ($\times 10^{-6}$/% RH) | 10.6 | 10.6 | 11.4 |
| Coefficient of thermal expansion ($\times 10^{-6}$/° C.) | 2.6 | 2.6 | 3.7 |
| Slitting conditions | S-1 | S-1 | S-1 |
| Properties |  |  |  |
| Cycle f (mm) | 65 | 65 | 65 |
| Edge weave amount α (μm) | 1.5 | 1.5 | 1.5 |
| Recording track width Tw (μm) | 20 | 27.5 | 20 |
| Reproducing track width Tr (μm) | 12 | 12 | 12 |
| Tape-feeding speed V (mm/sec.) | 4000 | 4000 | 4000 |
| Distance between servo tracks (μm) | 2800 | 2800 | 2800 |
| α/(Tw − Tr) | 0.19 | 0.10 | 0.19 |
| V/f($s^{-1}$) | 61.5 | 61.5 | 61.5 |
| [α/(Tw − Tr)] × (V/f) ($s^{-1}$) | 11.5 | 6.0 | 11.5 |
| α × (V/f) (mm/sec.) | 92.3 | 92.3 | 92.3 |
| PES (μm) | 0.15 | 0.15 | 0.15 |
| Off-track amount (edge weave) (μm) | 0.2 | 0.2 | 0.2 |
| Off-track (edge weave) (%) | 1.8 | 1.3 | 1.8 |
| Change in humidity (%/RH) | 70 | 70 | 70 |
| Change in temperature (° C.) | 19 | 19 | 19 |
| Off-track amount (temperature/humidity expansion) (μm) | 1.1 | 1.1 | 1.2 |
| Temperature/humidity expansion (%) | 0.1 | 0.1 | 0.1 |
| Off-track due to expansion (%) | 5.6 | 4.0 | 6.1 |
| Sum of off-track amounts (μm) | 1.3 | 1.3 | 1.4 |
| Total of off-track (%) | 7.4 | 5.3 | 7.9 |
| Decrease in output from the same apparatus (%) | 0 | 0 | 0 |
| Reproduction using an apparatus having 3 μm dislocation from the tracks (%) | 2 | 0 | 3 |

TABLE 2

|  | Ex. 4 | Ex. 5 | Ex. 6 |
|---|---|---|---|
| Non-magnetic support |  |  |  |
| Material | PEN | PEN | PEN |
| Thickness (μm) | 6.2 | 6.2 | 6.2 |
| Coefficient of humidity expansion in widthwise direction ($\times 10^{-6}$/% RH) | 5.6 | 5.6 | 5.6 |
| Coefficient of thermal expansion in widthwise direction ($\times 10^{-6}$/° C.) | −7.4 | −7.4 | −7.4 |
| Coefficient of humidity expansion in lengthwise direction ($\times 10^{-6}$/% RH) | 11.8 | 11.8 | 11.8 |
| Coefficient of thermal expansion in lengthwise direction ($\times 10^{-6}$/° C.) | 4.1 | 4.1 | 4.1 |
| MD (Gpa) | 6.5 | 6.5 | 6.5 |
| MD/TD | 0.54 | 0.54 | 0.54 |
| Primer layer | U-3 | U-3 | U-2 |
| Magnetic layer | M | M | M |
| Backcoat layer | B-1 | B-1 | B-2 |
| Tape |  |  |  |
| Total thickness (μm) | 8.65 | 8.65 | 8.65 |
| Coefficient of humidity expansion ($\times 10^{-6}$/% RH) | 11.0 | 11.0 | 10.8 |
| Coefficient of thermal expansion ($\times 10^{-6}$/° C.) | 3.2 | 3.2 | 2.9 |
| Slitting conditions | S-1 | S-2 | S-2 |

TABLE 2-continued

|  | Ex. 4 | Ex. 5 | Ex. 6 |
|---|---|---|---|
| Properties |  |  |  |
| Cycle f (mm) | 65 | 65 | 65 |
| Edge weave amount α (μm) | 1.5 | 0.8 | 0.8 |
| Recording track width Tw (μm) | 20 | 20 | 20 |
| Reproducing track width Tr (μm) | 12 | 12 | 12 |
| Tape-feeding speed V (mm/sec.) | 4000 | 4000 | 4000 |
| Distance between servo tracks (μm) | 2800 | 2800 | 2800 |
| α/(Tw − Tr) | 0.19 | 0.10 | 0.10 |
| V/f($s^{-1}$) | 61.5 | 61.5 | 61.5 |
| [α/(Tw − Tr)] × (V/f) ($s^{-1}$) | 11.5 | 6.2 | 6.2 |
| α × (V/f) (mm/sec.) | 92.3 | 49.2 | 49.2 |
| PES (μm) | 0.15 | 0.08 | 0.08 |
| Off-track amount (edge weave) (μm) | 0.2 | 0.1 | 0.1 |
| Off-track (edge weave) (%) | 1.8 | 1.0 | 1.0 |
| Change in humidity (%/RH) | 70 | 70 | 70 |
| Change in temperature (° C.) | 19 | 19 | 19 |
| Off-track amount (temperature/humidity expansion) (μm) | 1.2 | 1.2 | 1.1 |
| Temperature/humidity expansion (%) | 0.1 | 0.1 | 0.1 |
| Off-track due to expansion (%) | 5.8 | 5.8 | 5.7 |
| Sum of off-track amounts (μm) | 1.4 | 1.3 | 1.2 |
| Total of off-track (%) | 7.6 | 6.8 | 6.7 |
| Decrease in output from the same apparatus (%) | 0 | 0 | 0 |
| Reproduction using an apparatus having 3 μm dislocation from the tracks (%) | 3 | 2 | 2 |

TABLE 3

|  | Ex. 7 | Ex. 8 | Ex. 9 |
|---|---|---|---|
| Non-magnetic support |  |  |  |
| Material | PEN | PEN | PEN |
| Thickness (μm) | 6.2 | 6.2 | 6.2 |
| Coefficient of humidity expansion in widthwise direction (× $10^{-6}$/% RH) | 5.6 | 5.6 | 5.6 |
| Coefficient of thermal expansion in widthwise direction (× $10^{-6}$/° C.) | −7.4 | −7.4 | −7.4 |
| Coefficient of humidity expansion in lengthwise direction (× $10^{-6}$/% RH) | 11.8 | 11.8 | 11.8 |
| Coefficient of thermal expansion in lengthwise direction (× $10^{-6}$/° C.) | 4.1 | 4.1 | 4.1 |
| MD (Gpa) | 6.5 | 6.5 | 6.5 |
| MD/TD | 0.54 | 0.54 | 0.54 |
| Primer layer | U-1 | U-1 | U-4 |
| Magnetic layer | M | M | M |
| Backcoat layer | B-1 | B-2 | B-3 |
| Tape |  |  |  |
| Total thickness (μm) | 8.65 | 8.65 | 8.65 |
| Coefficient of humidity expansion (× $10^{-6}$/% RH) | 10.6 | 10 | 8.2 |
| Coefficient of thermal expansion (× $10^{-6}$/° C.) | 2.6 | 1.9 | 2.4 |
| Slitting conditions | S-1 | S-2 | S-2 |
| Properties |  |  |  |
| Cycle f (mm) | 65 | 65 | 65 |
| Edge weave amount α (μm) | 1.5 | 0.8 | 0.8 |
| Recording track width Tw (μm) | 20 | 20 | 20 |
| Reproducing track width Tr (μm) | 12 | 12 | 12 |
| Tape-feeding speed V (mm/sec.) | 4000 | 4000 | 4000 |
| Distance between servo tracks (μm) | 2800 | 2800 | 2800 |
| α/(Tw − Tr) | 0.19 | 0.1 | 0.1 |
| V/f($s^{-1}$) | 61.5 | 61.5 | 61.5 |
| [α/(Tw − Tr)] × (V/f) ($s^{-1}$) | 11.5 | 6.2 | 6.2 |
| α × (V/f) (mm/sec.) | 92.3 | 49.2 | 49.2 |
| PES (μm) | 0.15 | 0.08 | 0.08 |
| Off-track amount (edge weave) (μm) | 0.2 | 0.1 | 0.1 |
| Off-track (edge weave) (%) | 1.8 | 1.0 | 1.0 |
| Change in humidity (%/RH) | 70 | 70 | 70 |
| Change in temperature (° C.) | 19 | 19 | 19 |
| Off-track amount (temperature/humidity expansion) (μm) | 1.1 | 0.8 | 0.9 |
| Temperature/humidity expansion (%) | 0.1 | 0.1 | 0.1 |
| Off-track due to expansion (%) | 5.6 | 5.2 | 4.3 |
| Sum of off-track amounts (μm) | 1.3 | 1.1 | 1.0 |
| Total of off-track (%) | 7.4 | 6.1 | 5.3 |
| Decrease in output from the same apparatus (%) | 0 | 0 | 0 |
| Reproduction using an apparatus having 3 μm dislocation from the tracks (%) | 3 | 1 | 0 |

TABLE 4

|  | Com. Ex. 1 | Com. Ex. 2 | Com. Ex. 3 |
|---|---|---|---|
| Non-magnetic support |  |  |  |
| Material | PEN | PEN | PEN |
| Thickness (μm) | 6.2 | 6.2 | 6.2 |
| Coefficient of humidity expansion in widthwise direction (× $10^{-6}$/% RH) | 10.6 | 10.6 | 10.6 |
| Coefficient of thermal expansion in widthwise direction (× $10^{-6}$/° C.) | 8.7 | 14.6 | 8.7 |
| Coefficient of humidity expansion in lengthwise direction (× $10^{-6}$/% RH) | 6.4 | 6.4 | 6.4 |
| Coefficient of thermal expansion in lengthwise direction (× $10^{-6}$/° C.) | −5.7 | −5.7 | −5.7 |
| MD (Gpa) | 8.1 | 8.1 | 8.1 |
| MD/TD | 1.23 | 1.23 | 1.23 |
| Primer layer | U-2 | U-2 | U-3 |
| Magnetic layer | M | M | M |
| Backcoat layer | B-1 | B-1 | B-2 |
| Tape |  |  |  |
| Total thickness (μm) | 8.65 | 8.65 | 8.65 |
| Coefficient of humidity expansion (× $10^{-6}$/% RH) | 15.8 | 15.8 | 14.9 |
| Coefficient of thermal expansion (× $10^{-6}$/° C.) | 17.9 | 23.1 | 16.6 |
| Slitting conditions | S-1 | S-1 | S-1 |
| Properties |  |  |  |
| Cycle f (mm) | 65 | 65 | 65 |
| Edge weave amount α (μm) | 1.5 | 1.5 | 1.5 |
| Recording track width Tw (μm) | 20 | 20 | 20 |
| Reproducing track width Tr (μm) | 12 | 12 | 12 |
| Tape-feeding speed V (mm/sec.) | 4000 | 4000 | 4000 |
| Distance between servo tracks (μm) | 2800 | 2800 | 2800 |
| α/(Tw − Tr) | 0.19 | 0.19 | 0.19 |
| V/f($s^{-1}$) | 61.5 | 61.5 | 61.5 |
| [α/(Tw − Tr)] × (V/f) ($s^{-1}$) | 11.5 | 11.5 | 11.5 |
| α × (V/f) (mm/sec.) | 92.3 | 92.3 | 92.3 |
| PES (μm) | 0.15 | 0.15 | 0.15 |
| Off-track amount (edge weave) (μm) | 0.2 | 0.2 | 0.2 |
| Off-track (edge weave) (%) | 1.8 | 1.8 | 1.8 |
| Change in humidity (%/RH) | 70 | 70 | 70 |
| Change in temperature (° C.) | 19 | 19 | 19 |
| Off-track amount (temperature/humidity expansion) (μm) | 2.0 | 2.2 | 1.9 |
| Temperature/humidity expansion (%) | 0.1 | 0.1 | 0.1 |
| Off-track due to expansion (%) | 10.1 | 10.8 | 9.5 |
| Sum of off-track amounts (μm) | 2.2 | 2.4 | 2.1 |
| Total of off-track (%) | 11.9 | 12.6 | 11.3 |
| Decrease in output from the same apparatus (%) | 0 | 0 | 0 |
| Reproduction using an apparatus having 3 μm dislocation from the tracks (%) | 10 | 11 | 9 |

TABLE 5

|  | Com. Ex. 4 | Com. Ex. 5 |
|---|---|---|
| Non-magnetic support |  |  |
| Material | PEN | PEN |
| Thickness (μm) | 6.2 | 6.2 |
| Coefficient of humidity expansion in widthwise direction ($\times 10^{-6}$/% RH) | 5.6 | 10.6 |
| Coefficient of thermal expansion in widthwise direction ($\times 10^{-6}$/° C.) | −7.4 | 8.7 |
| Coefficient of humidity expansion in lengthwise direction ($\times 10^{-6}$/% RH) | 11.8 | 6.4 |
| Coefficient of thermal expansion in lengthwise direction ($\times 10^{-6}$/° C.) | 4.1 | −5.7 |
| MD (Gpa) | 6.5 | 8.1 |
| MD/TD | 0.54 | 1.23 |
| Primer layer | U-2 | U-2 |
| Magnetic layer | M | M |
| Backcoat layer | B-1 | B-2 |
| Tape |  |  |
| Total thickness (μm) | 8.65 | 8.65 |
| Coefficient of humidity expansion ($\times 10^{-6}$/% RH) | 11.4 | 15.8 |
| Coefficient of thermal expansion ($\times 10^{-6}$/° C.) | 3.7 | 17.9 |
| Slitting conditions | S-3 | S-3 |
| Properties |  |  |
| Cycle f (mm) | 65 | 65 |
| Edge weave amount α (μm) | 2.5 | 2.5 |
| Recording track width Tw (μm) | 20 | 20 |
| Reproducing track width Tr (μm) | 12 | 12 |
| Tape-feeding speed V (mm/sec.) | 4000 | 4000 |
| Distance between servo tracks (μm) | 2800 | 2800 |
| α/(Tw − Tr) | 0.31 | 0.31 |
| V/f(s$^{-1}$) | 61.5 | 61.5 |
| [α/(Tw − Tr)] × (V/f) (s$^{-1}$) | 19.2 | 19.2 |
| α × (V/f) (mm/sec.) | 153.8 | 153.8 |
| PES (μm) | 0.25 | 0.25 |
| Off-track amount (edge weave) (μm) | 0.3 | 0.3 |
| Off-track (edge weave) (%) | 3.0 | 3.0 |
| Change in humidity (%/RH) | 70 | 70 |
| Change in temperature (° C.) | 19 | 19 |
| Off-track amount (temperature/humidity expansion) (μm) | 1.2 | 2.0 |
| Temperature/humidity expansion (%) | 0.1 | 0.1 |
| Off-track due to expansion (%) | 6.1 | 10.1 |
| Sum of off-track amounts (μm) | 1.6 | 2.4 |
| Total of off-track (%) | 9.1 | 13.1 |
| Decrease in output from the same apparatus (%) | 0 | 0 |
| Reproduction using an apparatus having 3 μm dislocation from the tracks (%) | 5 | 11 |

TABLE 6

|  |  | U-1 | U-2 | U-3 |
|---|---|---|---|---|
| Primer layer | Thickness (μm) | 1.8 | 1.8 | 1.8 |
| Component | Iron oxide (parts) | 68 | 68 | 68 |
|  | Alumina (parts) | 8 | 8 | 8 |
|  | Carbon black (parts) | 24 | 24 | 24 |
|  | Lubricant (parts) | 3 | 3 | 3 |
|  | Polyvinyl chloride (parts) | 8.8 | 8.8 | 8.8 |
|  | Polyurethane (parts) | 0 | 4.4 | 2.2 |
|  | Polyamideimide (parts) | 4.4 | 0 | 2.2 |
|  | Crosslinking agnet (parts) | 2 | 2 | 2 |

TABLE 7

|  |  |  | U-4 |
|---|---|---|---|
| Primer layer |  | Thickness (μm) | 1.8 |
|  | Component | 50 nm plate iron oxide (parts) | 68 |
|  |  | 50 nm plate alumina (parts) | 8 |
|  |  | Carbon black (parts) | 24 |
|  |  | Lubricant (parts) | 3 |
|  |  | Vinyl chloride copolymer (parts) | 8.8 |
|  |  | Polyurethane (parts) | 4.4 |
|  |  | Polyamideimide (parts) | 0 |
|  |  | Crosslinking agnet (parts) | 2 |

TABLE 8

|  |  |  | M |
|---|---|---|---|
| Magnetic layer |  | Thickness (μm) | 0.15 |
|  | Component | Ferromagnetic iron-based metal powder (parts) | 100 |
|  |  | Alumina (parts) | 10 |
|  |  | Carbon black (parts) | 1 |
|  |  | Lubricant (parts) | 4.5 |
|  |  | Polyvinyl chloride (parts) | 12.3 |
|  |  | Polyurethane (parts) | 5.5 |
|  |  | Crosslinking agent (parts) | 2 |

TABLE 9

|  |  |  | B-1 | B-2 |
|---|---|---|---|---|
| Backcoat layer |  | Thickness (μm) | 0.5 | 0.5 |
|  | Component | Red iron oxide (parts) | 10 | 10 |
|  |  | Carbon black (parts) | 90 | 90 |
|  |  | Cellulose resin (parts) | 44 | 44 |
|  |  | Polyurethane (parts) | 31 | 0 |
|  |  | Polyamideimide (parts) | 0 | 31 |
|  |  | Crosslinking agent (parts) | 13 | 13 |

TABLE 10

|  |  |  | B-3 |
|---|---|---|---|
| Backcoat layer |  | Thickness (μm) | 0.5 |
|  | Component | 50 nm plate iron oxide (parts) | 9 |
|  |  | 50 nm plate alumina (parts) | 1 |
|  |  | Carbon black (parts) | 90 |
|  |  | Cellulose resin (parts) | 44 |
|  |  | Polyurethane (parts) | 31 |
|  |  | Polyamideimide (parts) | 0 |
|  |  | Crosslinking agent (parts) | 13 |

TABLE 11

|  |  | S-1 | S-2 | S-3 |
|---|---|---|---|---|
| Slitting conditions | Sucking section | Mesh | Mesh | 13.5 mm pitch |
|  | Sucking pressure ($\times 10^4$ Pa) | 1.33 | 1.33 | 1.33 |
|  | Winding angle | 188° | 188° | 188° |
|  | Driving belt | Flat belt | — | Flat belt |
|  | Coupling material | Rubber | — | Rubber |
|  | Direct drive | — | done | — |
|  | Slitting speed (m/min.) | 200 | 200 | 200 |

The following properties of the magnetic tapes and the magnetic tape cartridges obtained by Examples and Comparative Examples were evaluated.

<Amount of Fluctuation in Edge Weave in Tape Widthwise Direction, and Cycle of Edge Weave in Tape Lengthwise Direction>

The amount of fluctuation in a weave of one of the edges of a magnetic tape in the tape widthwise direction and on the side of reference for the running of the tape (an edge weave amount) $\alpha$ was measured on 50 m length of the tape, using a servo writer (Hitachi Maxell) equipped with a meter for measuring a fluctuation in the tape widthwise direction (Hitach Maxell). The resultant fluctuation amount in the tape widthwise direction was subjected to Fourier analysis so as to determine the fluctuation amount in the tape widthwise direction, i.e., the edge weave amount $\alpha$, and the cycle f of the edge weave in the tape widthwise direction.

<Amount of Off-Track (Temperature/Humidity Expansion)>

The maximum dislocation from the position of a track (dislocation from a position 1,400 μm away from a servo track), which was found when the ambient atmosphere, i.e., the temperature and the humidity were changed from 10° C. and 10% RH to 29° C. and 80% RH, respectively, was determined from the coefficient of thermal expansion and the coefficient of humidity expansion of the magnetic tape.

<Off-Track Due to Expansion of Tape>

Tracking failure occurs in servo signals because of the expansion or contraction of a magnetic tape while heads are tracing the servo signals on the magnet tape. The term "off-track expansion" seen in Tables 1 to 5 means off-track which occurs because of the expansion or contraction of a magnetic tape. The off-track amount was measured with a commercially available drive (model: Ultrium 230i, manufactured by Hewlett-Packard (HP)).

<Decrease in Output with the Same Apparatus>

An adapted LTO drive was used to perform recording (the recording wavelength: 0.55 μm) at a temperature of 10° C. and a humidity of 10% RH. The output of reproduction of the recorded signals was measured at a temperature of 29° C. and a humidity of 80% RH, and a decrease in the output (%) was determined based on the reproduction output measured at a temperature of 10° C. and a humidity of 10% RH. The recording heads and the reproducing heads (MR heads) used had track widths shown in Tables 1 to 5.

<Reproduction Using Apparatus Having Dislocation of 3 μm from Tracks>

The phrase "reproduction using an apparatus having dislocation of 3 μm from tracks" seen in Table 1 to 5 means a rate of decrease in reproduction output with an apparatus having 3 μm dislocation from the reproducing track width.

The results of the measurement are shown in the column of "Properties" in Tables 1 to 5. As is understood from these results, no decrease in reproduction outputs from the same apparatus having 3 μm dislocation from the tracks was observed in the magnetic tapes and the magnetic tape cartridges of Comparative Examples 1 to 5, while 5% or higher of decreases in reproduction outputs due to off-track were observed in the same magnet tapes and the same magnetic tape cartridges. On the other hand, 3.5% or lower of decreases in the outputs due to off-track were observed in the magnet tapes and the magnetic tape cartridges of Examples of the present invention. Particularly, the decreases in the outputs due to off-track were 2% or lower in the magnet tapes and the magnet tape cartridges of Examples 1, 2, 5, 6, 8 and 9, and thus, it is confirmed that these magnet tapes and magnet tape cartridges are especially excellent in off-track characteristics.

As has been described above, according to the present invention, a magnet tape in which the recording track width is 28 μm or less, particularly 21 μm or less, and a difference [(recording track width)−(reproducing track width)], 16 μm or less, hardly causes off-track, even when the ambient humidity or temperature changes. Therefore, such a magnetic tape and a magnetic tape cartridge comprising the same are excellent in serve performance with a lower error rate, and are suitably used as highly reliable backup tapes for computers.

The invention claimed is:

1. A magnetic tape, to be used at a running speed of at least 4,000 mm/sec., comprising a non-magnetic support, a magnetic layer formed on one surface of the non-magnetic support, and a backcoat layer formed on the other surface of the non-magnetic support, wherein servo signals for controlling tracking are recorded on the magnetic layer or the backcoat layer, and wherein the difference between the recording track width and the reproducing track width is 16 μm or less, wherein the value of $[\alpha/(Tw-Tr)]$ is 0.2 or less, wherein is $\alpha$ [in μm] is an amount of a weave occurring on one of both edges of the magnetic tape and on the side of reference for the running of the tape; Tw [in μm] is a recording track width; and Tr [in μm] is a reproducing track width, and wherein a coefficient of humidity expansion in the tape widthwise direction is $(0 \text{ to } 14) \times 10^{-6}$/% RH; and a coefficient of thermal expansion in the tape widthwise direction is $(0 \text{ to } 10) \times 10^{-6}$/° C.

2. A magnetic tape, to be used at a running speed of at least 4,000 mm/sec., comprising a non-magnetic support, a magnetic layer formed on one surface of the non-magnetic support, and a backcoat layer formed on the other surface of the non-magnetic support, wherein servo signals for controlling tracking are recorded on the magnetic layer or the backcoat layer, and wherein the difference between the recording track width and the reproducing track width is 16 μm or less, and the value of $[\alpha/(Tw-Tr)] \times (V/f)$ is 14 $[s^{-1}]$ or less, and wherein V [in mm/sec.] is a tape-running speed; $\alpha$ [in μm] is an amount of a weave with a cycle of f [in mm] occurring on one of both edges of the magnetic tape and on the side of reference for the running of the tape; Tw [in μm] is a recording track width; and Tr [in μm] is a reproducing track width, and that a coefficient of humidity expansion in the tape widthwise direction is $(0 \text{ to } 14) \times 10^{-6}$/% RH; and a coefficient of thermal expansion in the tape widthwise direction, $(0 \text{ to } 10) \times 10^{-6}$/° C.

3. A magnetic tape, to be used at a running speed of at least 4,000 mm/sec., comprising a non-magnetic support, a magnetic layer formed on one surface of the non-magnetic support, and a backcoat layer formed on the other surface of the non-magnetic support, wherein servo signals for controlling tracking are recorded on the magnetic layer or the backcoat layer, and wherein the difference between the recording track width and the reproducing track width is 16 μm or less, wherein the value of $[\alpha/(Tw-Tr)]$ is 0.2 or less, and the value of $[\alpha/(Tw-Tr)] \times (V/f)$ is 14 $[s^{-1}]$ or less, wherein V [in mm/sec.] is a tape-running speed; $\alpha$ [in μm] is an amount of a weave with a cycle of f [in mm] occurring on one of both edges of the magnetic tape and on the side of reference for the running of the tape; Tw [in μm] is a recording track width; and Tr [in μm] is a reproducing track width; and wherein coefficient of humidity expansion in the tape widthwise direction is (0 to 14)×10$^{-6}$/% RH; and a coefficient of thermal expansion in the tape widthwise direction is (0 to 10)×10$^{-6}$/° C.

4. A magnetic tape according to any one of claims 1 to 3, wherein the difference between the recording track width and the reproducing track width is 10 μm or less.

5. A magnetic tape cartridge comprising a box-shaped casing body, and a single reel which has a magnetic tape claimed in any one of claims 1 to 3, wound there around, and which is arranged in the casing body, wherein the tracking is controlled by servo signals recorded on the magnetic tape.

6. A magnetic tape cartridge according to claim 5, wherein the servo signals are recorded as magnetic signals on the magnetic layer or the backcoat layer of the magnetic tape.

7. A magnetic tape cartridge according to claim 5, wherein the servo signals are recorded as optical signals on the backcoat layer of the magnetic tape.

8. A magnetic tape cartridge according to claim 5, wherein the magnetically recorded signals on the magnetic tape are reproduced by reproducing heads which make use of magnetoresistance elements.

9. A magnetic tape cartridge according claim 6, wherein the magnetically recording signals on the magnetic tape are reproduced by reproducing heads which make use of magnetoresistance elements.

10. A magnetic tape cartridge according claim 7, wherein the magnetically recording signals on the magnetic tape are reproduced by reproducing heads which make use of magnetoresistance elements.

11. A magnetic tape cartridge comprising a box-shaped casing body, and a single reel which has a magnetic tape claimed in claim 4, wound there around and which is arranged in the casing body, wherein the tracking is controlled by servo signals recorded on the magnetic tape.

12. A magnetic tape cartridge according to claim 11, wherein the servo signals are recorded as magnetic signals on the magnetic layer or the backcoat layer of the magnetic tape.

13. A magnetic tape cartridge according to claim 11, wherein the servo signals are recorded as optical on the backcoat layer of the magnetic tape.

14. A magnetic tape cartridge according claim 12, wherein the in magnetically recorded signals on the magnetic tape are reproduced by reproducing heads which make use of magnetoresistance elements.

15. A magnetic tape cartridge according to claim 13, wherein the magnetically recorded signals on the magnetic tape are reproduced by reproducing heads which make use of magnetoresistance elements.

* * * * *